(12) United States Patent
He et al.

(10) Patent No.: US 7,442,780 B2
(45) Date of Patent: Oct. 28, 2008

(54) REACTIVE DYE COMPOUNDS

(75) Inventors: Wei Dong He, Leeds (GB); Peter Jeffrey Broadbent, Knaresborough (GB); David Malcolm Lewis, Otley (GB)

(73) Assignee: North Carolina State University, Raleigh, NC (US)

( * ) Notice: Subject to any disclaimer, the term of this patent is extended or adjusted under 35 U.S.C. 154(b) by 479 days.

(21) Appl. No.: 10/477,498

(22) PCT Filed: May 28, 2002

(86) PCT No.: PCT/US02/16420

§ 371 (c)(1),
(2), (4) Date: Jun. 2, 2004

(87) PCT Pub. No.: WO02/096995

PCT Pub. Date: Dec. 5, 2002

(65) Prior Publication Data

US 2004/0204571 A1    Oct. 14, 2004

(30) Foreign Application Priority Data

May 29, 2001  (GB) ................. 0112954.3
Aug. 4, 2001  (GB) ................. 0119051.1

(51) Int. Cl.
*C09B 62/002*   (2006.01)
*C09B 62/022*   (2006.01)
*C09B 62/04*    (2006.01)

(52) U.S. Cl. .......................... 534/634; 8/549
(58) Field of Classification Search ............. 534/634; 8/549

See application file for complete search history.

(56) References Cited

U.S. PATENT DOCUMENTS

| | | | | |
|---|---|---|---|---|
| 3,664,995 | A | * | 5/1972 | Andrew et al. .......... 534/624 |
| 4,584,367 | A | * | 4/1986 | Matsuo et al. ........... 534/634 |
| 4,701,523 | A | * | 10/1987 | Segal et al. ............. 534/634 |
| 4,841,029 | A | * | 6/1989 | Kato et al. .............. 534/634 |
| 4,898,933 | A | * | 2/1990 | Schlafer et al. ......... 534/605 |
| 4,916,215 | A | | 4/1990 | Hoyer et al. |
| 4,925,927 | A | * | 5/1990 | Tzikas .................... 534/618 |
| 4,925,928 | A | * | 5/1990 | Tzikas .................... 534/618 |
| 5,968,208 | A | | 10/1999 | Taylor |
| 5,976,197 | A | | 11/1999 | Hutchings et al. |
| 6,518,407 | B1 | * | 2/2003 | Brock et al. ............ 534/604 |

FOREIGN PATENT DOCUMENTS

| | | |
|---|---|---|
| DE | 0 103 165 | 3/1984 |
| GB | WO 00/08104 | 2/2000 |
| WO | WO 99/51684 | 10/1999 |

OTHER PUBLICATIONS

Mexican Office Action.
European Patent Office—Official Action dated Mar. 5, 2008.

\* cited by examiner

*Primary Examiner*—Fiona T Powers
(74) *Attorney, Agent, or Firm*—Jenkins, Wilson, Taylor & Hunt, P.A.

(57) ABSTRACT

New, highly multifunctional reactive dye compounds are provided. The number of leaving groups in the non-chromophoric part of the molecule added to the number of chromophore moieties is at least equal to 5, preferably in the range of from 5 to 12, more preferably from 5 to 6. The new reactive dye compounds preferably have at least two asymmetric bridges.

17 Claims, No Drawings

REACTIVE DYE COMPOUNDS

TECHNICAL FIELD

The present invention relates to reactive dye compounds. In particular the present invention relates to reactive dye compounds comprising at least one chromophoric moiety D and at least one leaving group Y. The sum of the number of chromophoric moiety or moieties D and the number of leaving group or groups Y is at least equal to 5.

BACKGROUND OF THE INVENTION

Reactive dye compounds are known in the art for dyeing various substrates. Such substrates include for example proteinaceous materials such as keratin, e.g. found in hair, skin and nails and various animal body parts such as horns, hooves and feathers, and other naturally occurring protein containing materials, e.g. silk and saccharide-derived materials such as those derived from cellulose or cellulose derivatives, e.g. natural products such as cotton, and synthetic fibres such as polyamides.

Examples of classes of such reactive dyes which are well known in the art include dyes containing a mono- or dichloro- or fluoro- 1,3,5-triazinyl group, trichloro-pyrimidyl or mono-chloro-difluoro pyrimidyl group, alpha,beta-dihalogen-propionyl group, beta-halogenoethyl-sulphonyl group, beta-halogenoethylsulphamyl group, chloroacetyl amino, beta-(chloro-methyl)-beta-sulphatoethylsulphamyl group, or a vinyl sulphonyl, 2,4-dinitro-3,5-difluoroaryl group.

In the case of the dyes containing a triazinyl group or a pyrimidyl group, in place of the reactive halogen atoms one can use other groups which dissociate on reaction with a nucleophile (leaving groups). Canadian Patent 771632, for example, discloses examples of such other groups including sulphonic acid, thiocyanate, sulphophenoxy, sulphophenyl thio, nitrosulphophenoxy groups, and quaternary ammonium groups.

Dyes and Pigments 14, 1990, pages 239-263, "Synthesis and Application of Reactive Dyes with Heterocyclic Reactive Systems" discloses fibre reactive dyes containing monochloro- or dichloro-pyrimidine heterocycle with quaternary ammonium substituents.

There are many different types of reactive dyes for dyeing cellulosic and polyamide-type substrates described in the art. WO9951684, Lewis et al., incorporated herein by reference, discloses reactive dyes comprising a) at least one chromophore moiety, b) at least one nitrogen-containing heterocycle, c) a linking group to link each chromophore moiety to each nitrogen-containing heterocycle characterised in that at least one nitrogen-containing heterocycle is substituted with at least one thio-derivative and at least one quaternized nitrogen derivative. These reactive dyes exhibit increased values of Exhaustion (E) and Fixation (F) compared to previous reactive dyes. A high Exhaustion value for a particular dye compound means that a low level of spent dye remains in the effluent after the dyeing process is complete. The Fixation Value (F) of a reactive dye compound is a measure of the extent of covalent bonding with the substrate based on the dye originally absorbed during the dyeing process.

In addition to these properties, it is also important that the reactive dyes perform well once they have been applied to the textile. The industrial tests commonly used to assess the performance of dyed textiles measure their light fastness, wet and dry crock resistance, dye-transfer staining behavior and wash fastness. In the light fastness test, dyed samples are placed in a sunlight-mimicking unit and irradiated for set amounts of time. The stain test is carried out by attaching to a sample a multifiber test strip. The swatches are run in consumer-mimicking conditions in a washing machine. The test is designed to evaluate any cross staining propensity of dye that might be removed in washing to stain other fibers. The wash fastness test measures the color change on the fabric from the original shade. The sample is washed under consumer-mimicking conditions in a washing machine and the assessment is done visually by a trained (experienced) technician.

SUMMARY OF THE INVENTION

According to the present invention there is provided reactive dye compounds comprising at least one chromophoric moiety D and at least one leaving group Y, wherein the sum of the number of chromophoric moiety or moieties D and the number of leaving group or groups Y is at least equal to 5, preferably in the range of from 5 to 12, more preferably from 5 to 6.

According to the present inventions there is also provided new reactive dye compounds having at least two asymmetric bridging moieties. The asymmetric bridging moieties are preferably dissymmetric, and are more preferably selected from the group consisting of cysteamine, cysteine and derivatives thereof, even more preferably from the group consisting of cysteamine and cysteine.

The preferred class of compounds according to the present invention has the general formula (I):

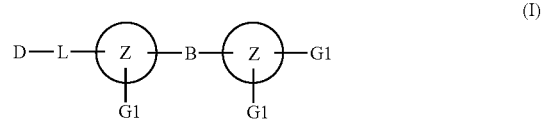

The precise meaning of D, L, B, Z and G1 is disclosed in the detailed description section below.

The compounds of the present invention exhibit excellent Exhaustion (E) and Fixation (F) values and also provide good results in terms of light fastness, wet and dry crock resistance, perspiration, dye-transfer staining and wash fastness. In addition, the compounds of the present invention provide significantly more intense dyeing, i.e. greater colour intensity in the dyed substrate than comparative dyeings with commercially available reactive dyes applied at equivalent depth of shades.

DETAILED DESCRIPTION OF THE INVENTION

As used herein the term "reactive dye" means a dye containing one or more reactive groups capable of forming covalent bonds with the substrate to be dyed, or a dye that forms such a reactive group in situ.

Preferred compounds according to the present invention have the following formula (I)

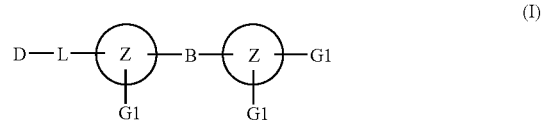

The precise meaning of D, L, B, Z and G1 is disclosed below.

Chromophore Moiety (D)

The reactive dye compounds herein can comprise one or more chromophore moieties D. In reactive dye compounds comprising two or more chromophore moieties these can be the same or different. Preferably the reactive dye compounds herein comprise from one to six chromophore moieties, more preferably from one to three chromophore moieties.

Any chromophore moieties suitable for use for dyeing substrates can be used in the present invention. The term customary for organic dyes, such as sulphonate substituents which enhance the water-soluble properties of the dye compound.

Examples of chromophore D moieties for use herein are polysulphonated azo chromophores such as those present in Procion™ dyes commercially available from BASF. Typical chromophores D are exemplified by those in Procion™ Red MX-8B, Procion™ Yellow MX-8G, Procion™ Yellow MX-3R and Procion™ Blue MX-2G.

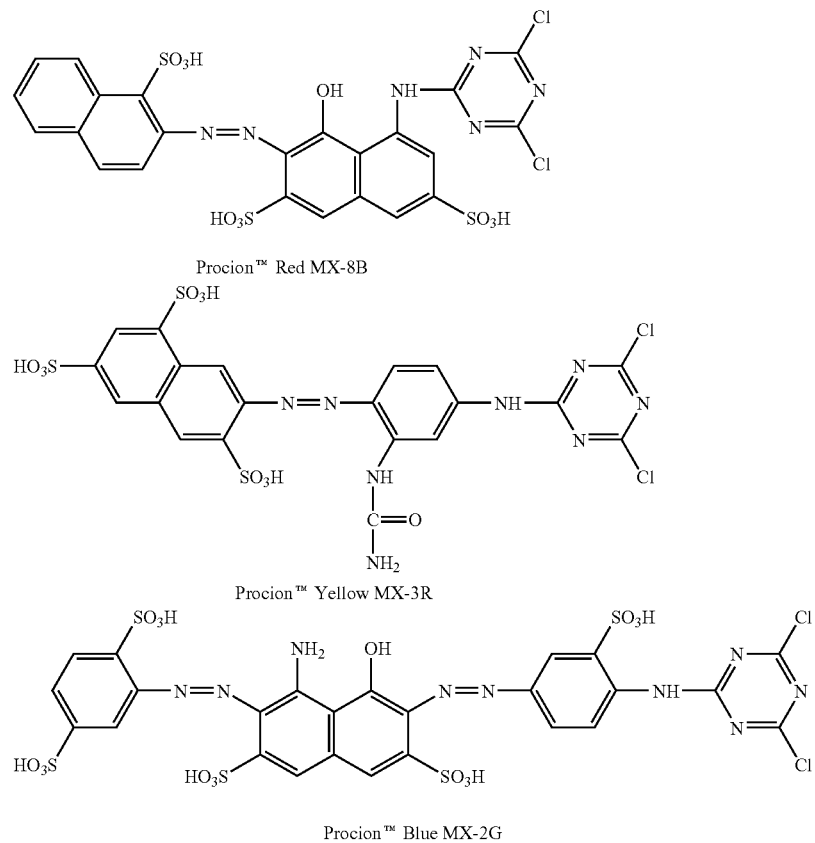

chromophore as used herein means any photoactive compound and includes any coloured or non-coloured light absorbing species, e.g. fluorescent brighteners, UV absorbers, IR absorbing dyes. The term chromophore as used herein also includes organic radical such as β-sulphatoethylsulphonyl benzene, vinyl sulphonyl benzene, chloroethylsulphonyl benzene, β-S-thiosulphatoethyl sulphonyl benzene, di(aminoethylsulphonyl) benzene provided that the reactive dye compound contains at least one other chromophore group.

Suitable chromophore moieties for use in the dye compounds herein include the radicals of monoazo, diazo or polyazo dyes, or heavy metal complex azo dyes derived therefrom, anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbimide dyes.

Other suitable chromophore moieties for use in the dye compounds herein include those disclosed in EP-A-0,735,107 (Ciba-Geigy), incorporated herein by reference, including the radicals described therein which contain substituents Conveniently the chromophoric part may be represented as D, thus these dyes can be represented by:

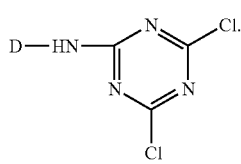

Other suitable chromophores are present in Drimalan™ and Drimarene™ dyes commercially available from Clariant and Levafix™ dyes commercially available from DyStar.

Linking Moiety (L)

The preferred compounds herein further comprise a linking moiety L that links each multi-bonding moiety Z (such as nitrogen-containing heterocycles) to each chromophore moiety D. Any linking moiety suitable for use in dyeing substrates can be used in the present invention.

Preferably the linking moiety is selected from the group consisting of —NR—, —C(O)NR—, NRSO$_2$, —(CH$_2$)$_k$— and —SO$_2$—(CH$_2$)$_k$— wherein R is H or C$_1$-C$_4$ alkyl which can be substituted by halogen, preferably fluorine or chlorine, hydroxyl, cyano, C$_1$-C$_4$ alkoxy, C$_2$-C$_5$ alkoxycarbonyl, carboxyl, sulfamoyl, sulfo or sulfato and wherein k is an integer with a value between 1 and 4. When the linking moiety is dissymmetric (such as —C(O)NR—, —NRSO$_2$—), the D and Z moieties can be linked to any side of the linking moiety. When Z is a triazine or pyrimidine, a preferred linking moiety is NR, preferably where R is H or C1-C4 alkyl, more preferably where R is H or CH$_3$, especially H. When Z is quinoxaline or phthalazine, a preferred linking moiety is —NR (C=O)—, where R is H or C1-C4 alkyl, more preferably where R is H or CH$_3$, especially H.

Multi-bonding Moiety Z

The multi-bonding moieties Z are functionally defined as moieties forming covalent bonds with at least 3 other moieties. In formula (I) to (IX) described below, these other moieties are selected from the group consisting of the linking moiety L defined above, bridging moiety B and moiety G1, which are defined hereafter. The exact nature of the moieties to which the Z moiety bonds depends on the position of the moiety Z inside the reactive-dye molecule as described in the general formula (I) or in the other preferred formula (II) to (IX). The number of multi-bonding moieties Z in the reactive dyes of formula (II) to (IX) of the present invention is at least 2, and for the reactive dyes of formula (I) it is at least three (the reactive dye compounds of formula (I) comprise at least one group G2, defined below).

In one reactive dye molecule, if there is two or more multi-bonding moieties Z these can be the same or different.

Preferred Z moieties are selected from the group consisting of nitrogen (N),

and aromatic compounds. Especially preferred are aromatic N-heterocycles and aromatic compounds activated by electron withdrawing groups.

When Z is

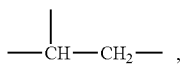

there is no preference to which carbon atom (primary or secondary) the other moieties (e.g. L, B and G1) are connected.

Preferably, the Z moieties herein comprise at least one aromatic compound. More preferably all Z moieties are selected from aromatic compounds, especially nitrogen containing heterocycles. Suitable nitrogen containing heterocycles for use herein include monocyclic, bicyclic or polycyclic, unsaturated heterocycles containing at least one nitrogen heteroatom. When monocyclic rings are used, they are preferably selected from unsaturated rings having from about 3 to about 7 ring atoms, especially 5 or 6 ring atoms, comprising from about 1 to about 3 nitrogen heteroatoms, preferably 2 or 3 nitrogen heteroatoms. When bicyclic heterocycles are used, they preferably comprise an unsaturated nitrogen containing heterocycle having 3 to 7 ring atoms, preferably an unsaturated nitrogen containing heterocycle having 5 or 6 ring atoms comprising 1 or 2 nitrogen atoms, fused to a 5 to 7 membered carbocycle preferably a 6-membered unsaturated carbocycle. When bicyclic heterocycles are used, the other moieties (e.g. L, B and G1) are preferably attached to the nitrogen containing heterocyclic ring.

Preferred for use herein are 5 or 6 membered unsaturated nitrogen containing monocyclic heterocyclic rings comprising 2 or 3 nitrogen heteroatoms or bicyclic rings containing a 5 or 6 membered unsaturated heterocyclic ring containing 2 nitrogen heteroatom fused to a 6 membered unsaturated carbocycle.

Examples of suitable heterocycles for use herein include, but are not necessarily limited to triazine, pyrimidine, quinoxaline, pyrimidinone, phthalazine, pyridazone and pyrazine. Preferred for use in the compounds herein are triazine, pyrimidine and quinoxaline.

Aromatic compounds activated by electron withdrawing groups such as NO, NO$_2$, CN, CHO, SO$_2$Me, NMe$^{3+}$, CF$_3$, COOH, COO—C1-C4 alkyl, SO$_3^-$, preferably NO or NO$_2$, are also suitable. An example of a suitable activated benzene ring is

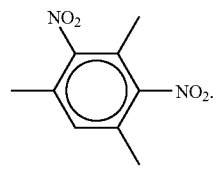

In addition to the bonding to L, B and G1, a Z moiety can be optionally bonded to other moieties such as one or more leaving group Y defined below.

Leaving Group Y

The reactive dyes of the present invention comprise at least one leaving group Y. The function of the leaving group Y is to be substituted during the dyeing process by a substituting nucleophilic group on the surface of the substrate. The covalent bond formed after the substitution accounts for the stability of the color on the substrate after the dyeing process is completed. Therefore reactive dyes preferably contain more than one leaving group. In the case of cellulosic fibers, the substitution process is usually carried out in alkaline condition (pH>8) in order to generate a sufficient concentration of nucleophilic cellulosate anions.

All groups capable of being substituted in the condition of the dyeing process are suitable. Examples of leaving groups are —Cl, —Br, —F, —I, —SO$_3$H, —OSO$_3$H, —SSO$_3$H, —O—C$_6$H$_4$—SO$_3$H, —OCO—CH$_3$, —OPO$_3$H$_2$, —OCO— C$_6$H$_5$, —OSO$_2$—C$_1$-C$_4$ alkyl, —OSO$_2$—N(C$_1$-C$_4$ alkyl)$_2$,

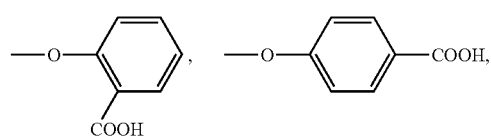

and quaternized nitrogen derivatives.

Preferred leaving groups Y are selected from the group consisting of —Cl, —Br, —F and —OSO$_3$H, more preferably from the group consisting of —Cl and —F when Y is bonded to an N-containing heterocycle and —Br when Y is bonded to

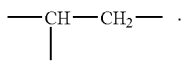

Examples of suitable quaternized nitrogen derivatives are described in WO99/51684, Brock et al. Particularly preferred quaternized nitrogen derivatives for use herein are nicotinate, diazabicyclooctane (DABCO), dimethylaminobetaine and isonicotinate, especially nicotinate.

In one reactive dye compound comprising more than one leaving group Y, these can be the same or different.

Group G1

G1 is selected from Y (leaving group as described above) and —B-G2. The function of G1 is to increase the multi-functionality of the reactive dye molecule by either providing a leaving group Y or a group G2 that comprises a multi-bonding group Z. G2 is defined hereafter. In reactive dye compounds comprising two or more groups G1, these can be the same or different.

Group G2

G2 is selected from

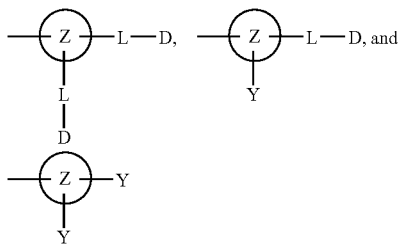

The function of G2 is to increase the multi-functionality of the reactive dye compound by increasing the number of leaving groups Y or chromophore moieties D. In reactive dye compounds comprising two or more groups G2, these can be the same or different.

Bridging Moiety B

The function of the bridging moieties B is to provide a junction between two Z groups. The bridging moieties are preferably selected from the group consisting of

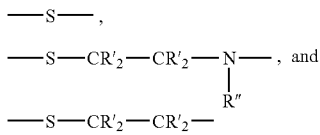

wherein R' is selected from the group consisting of H, C1-C10 alkyl group, C1-C10 carboxylic acid and sulphonate, preferably H, and wherein R" is selected from the group consisting of H, C1-C4 alkyl group and

—CR'$_2$—CR'$_2$—S-G2.

R' and R" can be the same or different inside a given bridging moiety.

Preferred bridging moieties are asymmetric, more preferably dissymmetric. Asymmetric as used herein means that the bridging moiety comprises at least two different functional groups that have reacted to form covalent bonds with other functional group. Dissymmetric as used herein means that the bridging moiety comprises two different functional groups with different affinity for the Z moieties. Preferred dissymmetric bridging moieties are based on cysteamine or cysteine and have the formula:

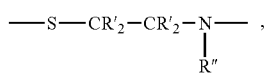

wherein R' and R" are as defined above. Even more preferred bridging moieties are cysteamine or cysteine:

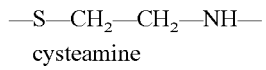

cysteamine

cysteine

It has now been found that asymmetric, preferably dissymmetric, bridging moieties allow a better control of the synthesis of reactive dye molecules. By choosing parameters such as the reaction temperature and pH, it is possible to control the number and the way bridging moieties attach to other moieties such as a multi-bonding moiety Z. It can also be controlled by what end (the sulphur or the nitrogen end in the case of cysteamine or cysteine) they will bond to a particular Z moiety.

In reactive dye compounds comprising two or more bridging moieties B, these can be the same or different.

Following formula (II) to (VI) below represent various embodiments of preferred reactive dyes according to formula (I) defined above.

Formula (VII), (VIII) and (IX) represent other preferred reactive dye compounds according to the present invention.

Preferred Reactive Dyes Having the Formula (II) Below:

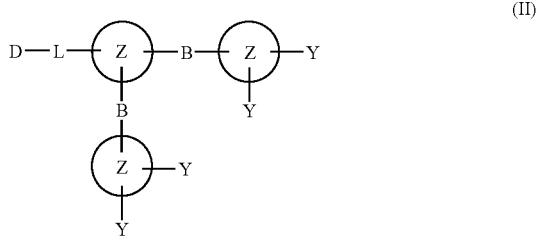

wherein

D is as defined in formula (I) above;

L is as defined in formula (I) above;

Z is as defined in formula (I) above;

Y is as defined in formula (I) above;

B is

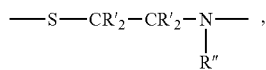

wherein R' is selected from the group consisting of H, C1-C10 alkyl group, C1-C10 carboxylic acid and sulphonate, preferably H; and R" is selected from the group consisting of H and C1-C4 alkyl group, B preferably being —NH—$CH_2$—$CH_2$—S— or —NH—CHCOOH—$CH_2$—S—;

wherein when there is more than one D, L, Z, Y, R, R', R" or B group these are not necessarily the same;

and salts and esters thereof.

Preferred Reactive Dyes Having the Formula (III) Below:

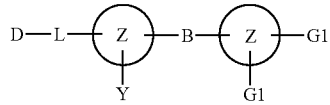

wherein
D is as defined in formula (I) above;
L is as defined in formula (I) above;
Z is as defined in formula (I) above;
Y is as defined in formula (I) above;
G1 is as defined in formula (I) above;
G2 is as defined in formula (I) above;
B is

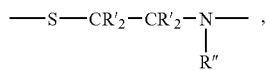

wherein R' is selected from the group consisting of H, C1-C10 alkyl group, C1-C10 carboxylic acid and sulphonate, preferably H; and R" is selected from the group consisting of H and C1-C4 alkyl group, B preferably being —NH—$CH_2$—$CH_2$—S— or —NH—CHCOOH—$CH_2$—S—;

wherein when there is more than one D, R, R', R", L, Z, Y, G1, G2 or B group these are not necessarily the same; and wherein the reactive dye compound comprises at least one group G2;

and salts and esters thereof.

Preferred Reactive Dyes Having the Formula (IV) Below:

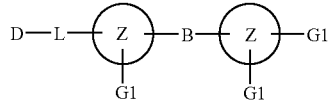

wherein
D is as defined in formula (I) above;
L is as defined in formula (I) above;
Z is as defined in formula (I) above;
Y is as defined in formula (I) above;
G1 is as defined in Formula (I) above;
G2 is as defined in Formula (I) above;
B is as defined in Formula (I) above;
wherein at least one, and preferably all, B is —S—,
wherein when there is more than one B, D, R, L, Z, Y, G1 or G2 within the same molecule these are not necessarily the same; and
wherein the reactive dye compound comprises at least one group G2;

and salts and esters thereof.

Preferred Reactive Dyes Having the Formula (V) Below:

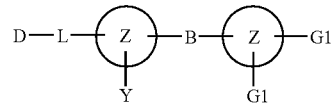

wherein
D is as defined in formula (I) above;
L is as defined in formula (I) above;
Z is as defined in formula (I) above;
Y is as defined in formula (I) above;
G1 is as defined in Formula (I) above;
G2 is as defined in Formula (I) above;
B is a bridging group selected from the group consisting of

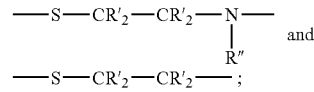

wherein R" is selected from the group consisting of H, C1-C4 alkyl group and
—$CR'_2$—$CR'_2$—S— G2; and
wherein R' is selected from the group consisting of H, C1-C10 alkyl group, C1-C10 carboxylic acid and sulphonate, preferably H,
wherein when there is more than one D, R, R', R", L, Z, Y, G1, G2, or B group these are not necessarily the same; and
wherein the reactive dye compound comprises at least one bridging group B wherein R" is —$CR'_2$—$CR'_2$—S-G2;

and salts and esters thereof.

Preferred Reactive Dyes Having the Formula (VI) Below:

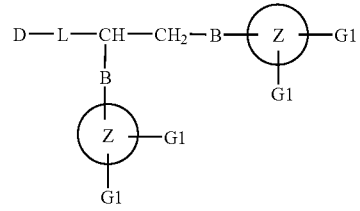

wherein
D is as defined in formula (I) above;
L is as defined in formula (I) above;
Z is as defined in formula (I) above
Y as defined in formula (I) above
G1 is as defined in Formula (I) above;
G2 is as defined in Formula (I) above;
B is a bridging moiety, preferably selected from the group consisting of

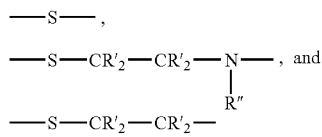

wherein R" is selected from the group consisting of H, C1-C4 alkyl group and —CR'$_2$—CR'$_2$—S-G2
wherein R' is selected from the group consisting of H, C1-C10 alkyl group, C1-C10 carboxylic acid and sulphonate, preferably H,
B preferably being —NH—CH$_2$—CH$_2$—S— or —NH—CHCOOH—CH$_2$—S—;
wherein when there is more than one D, R, R', R", L, Z, Y, G1, G2 or B group these are not necessarily the same;

and salts and esters thereof.

Other Preferred Reactive Dyes According to the Present Invention have the Formula (VII) Below:

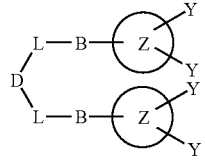

(VII)

wherein
D is as defined in formula (I) above;
L is as defined in formula (I) above;
Z is as defined in formula (I) above;
Y is as defined in formula (I) above
B is selected from the group consisting of

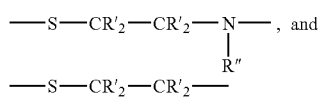

wherein R" is selected from the group consisting of H and C1—C4 alkyl group; and
wherein R' is selected from the group consisting of H, C1-C10 alkyl group, C1-C10 carboxylic acid and sulphonate, preferably H;
B preferably being —NH—CH$_2$—CH$_2$—S— or —NH—CHCOOH—CH$_2$—S—;
wherein each of R, R', R", L, Z, Y, or B are not necessarily the same;

and salts and esters thereof.

Other Preferred Reactive Dyes According to the Present Invention Have the Formula (VIII):

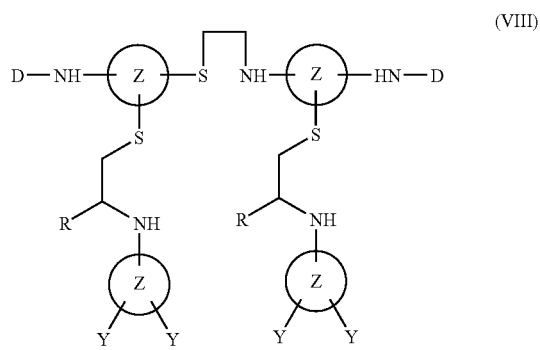

(VIII)

wherein
D is as defined in formula (I) above;
Z is as defined in formula (I) above;
Y is as defined in formula (I) above
R is selected from the group consisting of H, C$_1$-C$_{10}$ alkyl group, C$_1$-C$_{10}$ carboxylic acid and sulphonate, preferably H and COOH, more preferably H;
wherein each of D, R, Z and Y are not necessarily the same;

and salts and esters thereof.

Other Preferred Reactive Dyes According to the Present Invention Have the Formula (IX):

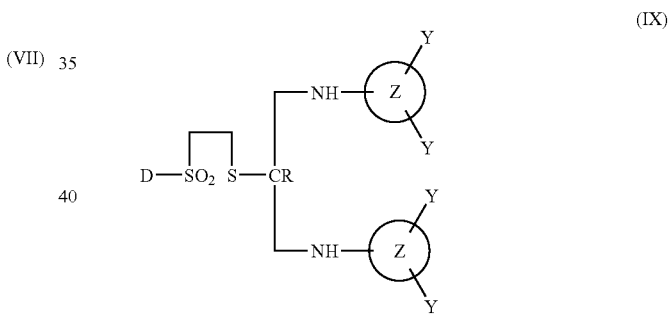

(IX)

wherein
D is as defined in formula (I) above;
Z is as defined in formula (I) above;
Y is as defined in formula (I) above;
R is selected from the group consisting of H, C$_1$-C$_{10}$ alkyl group, C$_1$-C$_{10}$ carboxylic acid and sulphonate, preferably H and COOH, more preferably H;
wherein each of Z or Y are not necessarily the same;

and salts and esters thereof.

Method of Preparation

The present invention furthermore relates to processes for the preparation of the dyes herein. In general, reactive dye compounds according to the present invention such as those having the general formula (I) to (IX) can be prepared by reacting suitable precursors with one another, at least one of which contains a group D-L-Z, wherein D, L and Z are as defined above. Various methods of preparations as well as different reactive dye molecules will be exemplified hereafter. The person skilled in the art can easily apply the following general reactions and the specific reactions exemplified to synthesize the different dyes covered by the present invention and in particular according to formula (I) to (IX) but not specifically exemplified.

One method for synthesizing reactive dyes according to the present invention using a starting reactive dye compound and bridging moiety B comprises the steps of:

a) reacting said starting dye compound with said bridging group B and forming one bond, and b) reacting the second moiety of said bridging group B with a moiety Z.

B is preferably dissymmetric and more preferably has the following formula:

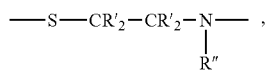

wherein R' is selected from the group consisting of H, C1-C10 alkyl group, C1-C10 carboxylic acid and sulphonate, preferably H; and R" is selected from the group consisting of H and $C_1$-$C_4$ alkyl group.

More preferably at least one R' is COOH.

Steps a) and/or step b) are preferably repeated at least twice.

Synthesis of Reactive Dyes According to Formula (II)

A general 2-steps synthesis route for these compounds is illustrated in Diagram 1 below. The starting material is a chromophore dye linked to a multi-bonding moiety Z comprising at least 2 leaving groups such as chlorine. These starting materials are commercially available or can be easily synthesized by the person skilled in the art. The first step of the reaction consists of the substitution of the two leaving groups by two bridging groups such as cysteamine. The second step of the reaction consists of the substitution of a Z multi-bonding moiety on the unreacted side of the two bridging moieties.

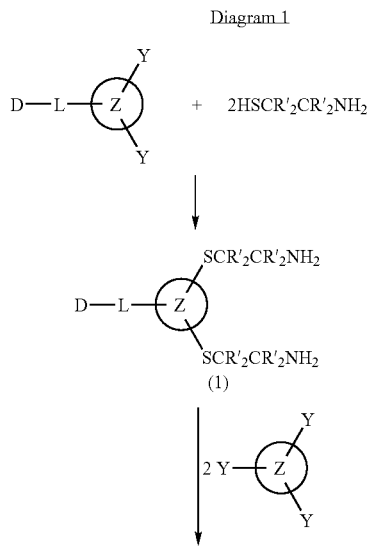

-continued

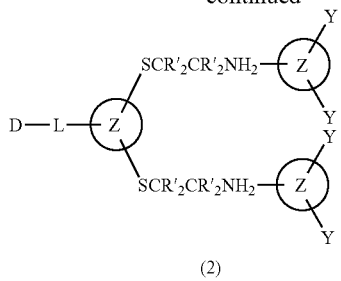

Alternatively, it would be obvious for the person skilled in the art that the dissymmetric bridging moiety can be first reacted with the multi-bonding Z moiety. The mercapto (—SH) moiety is more reactive than the amino (—NH$_2$) moiety, therefore this will lead to a final reactive dye wherein the starting reactive dye is linked to the amino moiety of the bridging group instead of its mercapto moiety.

SYNTHESIS of Reactive Dyes According to Formula (III)

A general 2-step synthesis route for these compounds is illustrated in Diagram 2 below. The starting material is a chromophore dye linked to a multi-bonding moiety Z comprising at least 2 leaving groups such as chlorine. These starting materials are commercially available or can be easily synthesized by the person skilled in the art. The first step of the reaction consists of the substitution of one of the leaving group by an asymmetric or dissymmetric bridging moiety B such as cysteamine. To avoid multi-substitution, the starting reactive dye and the bridging moiety B should be introduced in equimolar quantity and the temperature of the reaction sufficiently low. In the second step, two moles of the intermediates obtained after the first step are reacted with one mole of a Z multi-bonding moiety to give the final reactive dye. The reactive dyes according to formula (III) have at least 2 chromophore dye moieties and this synthesis can be easily adapted to obtain reactive dyes with two different chromophores by reacting the multi-bonding Z moiety to intermediates with different dye chromophores as is exposed in the following diagram.

Alternatively, the asymmetric bridging moiety B can be first reacted with the multi-bonding Z moiety. In the case of cysteamine, the mercapto (—SH) moiety is more reactive than the amino (—NH$_2$) moiety. In the final reactive dye, the starting reactive dye is therefore linked to the amino moiety of the bridging moiety instead of its mercapto moiety.

When All Starting Reactive Dyes are the Same:

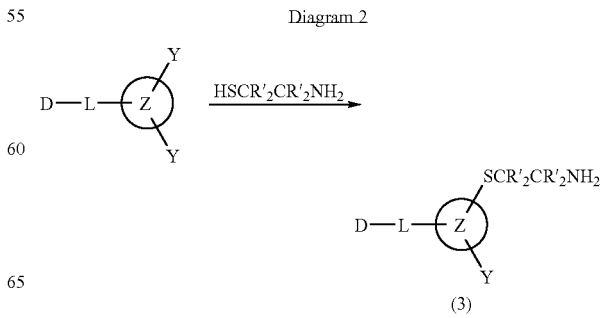

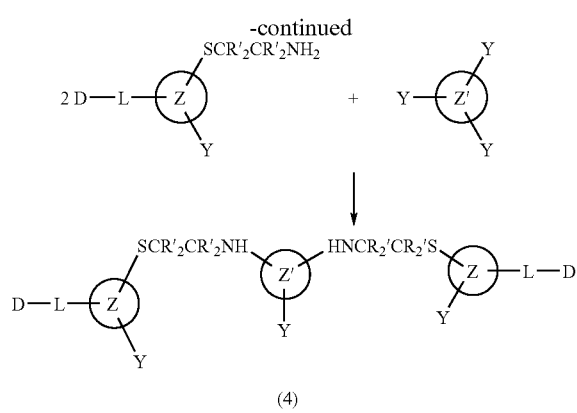

(4)

A third group (3) can be substituted on the Z' group to give a molecule comprising 3 dye moieties.

When the Starting Reactive Dyes are Different:

The first step is repeated once for each different starting reactive dye. They are subsequently substituted on the Z' moiety. With two different starting reactive dyes, the final compound is:

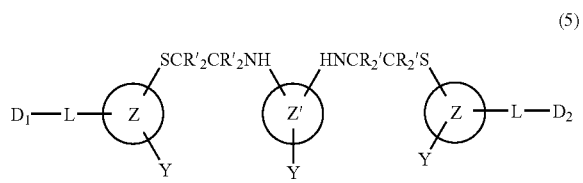

(5)

As usual, inside one reactive dye compound each of L, Z, R' and Y groups can be the same or different.

EXAMPLES

The following examples serve to illustrate the compounds and compositions of the present invention.

The starting compounds and components given in the examples above are usually used in form of their sodium salts. The starting reactive dye compounds can be purified by conventional means from the commercially available reactive dyes mentioned in the examples below.

Examples 1, 2, 3, 4 and 5 exemplify reactive dye compounds according to Formula (II).

Examples 6, 7 and 8 exemplify reactive dye compounds according to Formula (III).

Example 9 exemplifies reactive dye compounds according to Formula (IV).

Examples 10, 11 and 12 exemplify reactive dye compounds according to Formula (V).

Examples 13 and 14 exemplify reactive dye compounds according to Formula (VI).

Examples 15, 16, 17 and 18 exemplify reactive dye compounds according to Formula (VII).

Example 1

Cysteamine hydrochloride (0.2 mol) was dissolved in water (150 ml) and the pH of the solution adjusted to 7.5 with the addition of solid sodium carbonate at 20° C. To this solution was added slowly a solution of 0.1 mol of a dichloro-5-triazine dye, Procion™ Yellow MX-3R dissolved in 300 ml water.

The nucleophilic substitution with the thiol started immediately resulting in the formation of compound 1(a). The liberated HCl was continuously neutralized by additions of sodium carbonate. After 5-8 hours this first-stage reaction was complete as indicated by stabilisation of the pH. At this stage the bis-cysteamine dye 1(a) was isolated by reducing the pH to 4; the solid dye was filtered off and washed with a sodium sulphate solution (20% w/w) to remove unreacted cysteamine.

The above reaction is summarized in the diagram below:

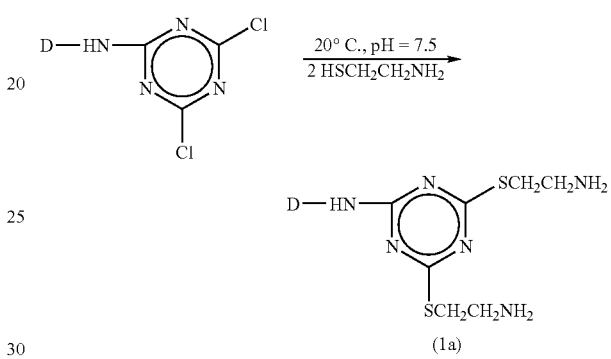

Cyanuric chloride (0.2 mol) was dissolved in acetone (400 ml) and to this solution was added slowly, with good stirring, an aqueous solution of 1(a) prepared above (0.1 mol of dye dissolved in 200 ml water at pH 7.5—set with sodium carbonate). The temperature was maintained at 20° C. The reaction liberated hydrochloric acid and the pH was therefore maintained at 7.5 by portion wise additions of solid sodium carbonate as required. After 6 hours the pH stabilized indicating that the reaction was complete. Sodium sulphate was added to the solution to "salt out" the dye (1b) which was filtered and dried in a dessicator.

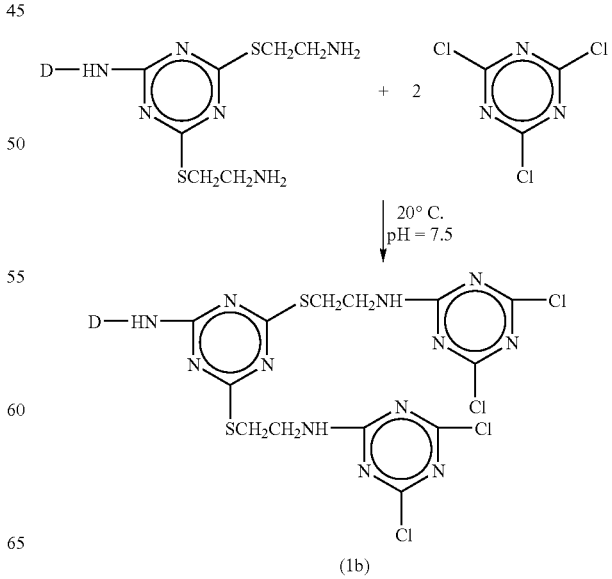

Example 2

The same procedure as in example 1 was followed except that cysteine hydrochloride was used instead of cysteamine hydrochloride to produce the dye (2b) below:

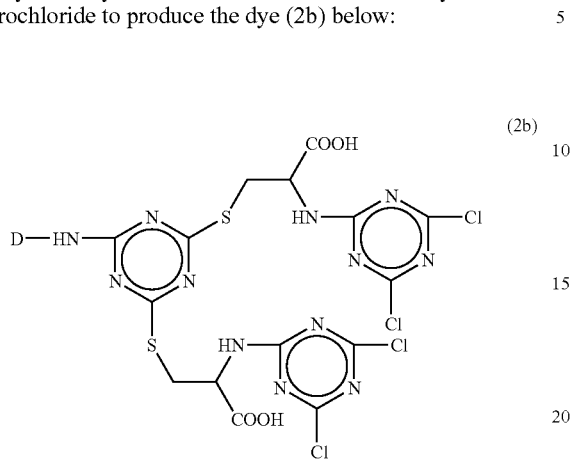

(2b)

The additional carboxylate groups present in the cysteine linkage means that the aqueous solubility of this dye is higher at pH values greater than 4. The use of such dyes in pad-batch, pad-steam or pad-bake processes requires high aqueous solubility ($>80$ g dm$^{-3}$) and thus the cysteine crosslink would provide excellent dyes for this purpose.

Example 3

In this example a trichloropyrimidine dye, Drimarene™ Yellow X-4RNA (Clariant) was used instead of the Procion™ MX dye as for example 1. The same synthesis route was used only for the difference that the temperature of the first stage of the reaction was 30° C. instead of 20° C. The following diagram summarizes the synthesis.

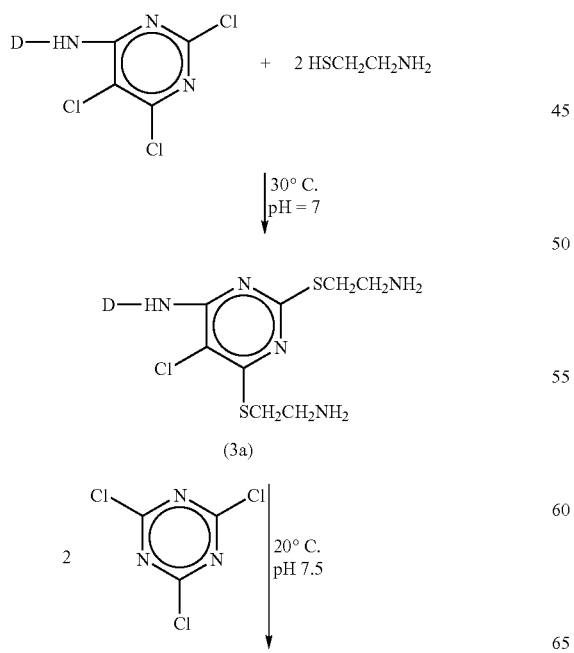

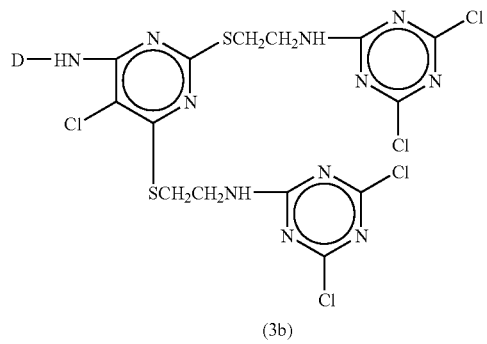

(3b)

Example 4

In this example a 2,4-difluoro-5-chloro pyrimidine dye, Drimarene™ Golden Yellow K-2R (Clariant) was used as starting reactive dye.

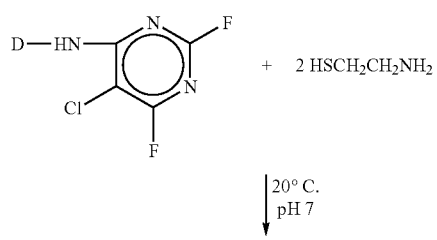

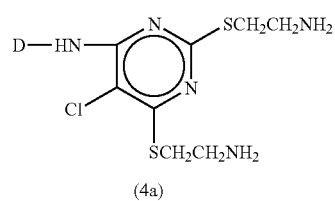

(4a)

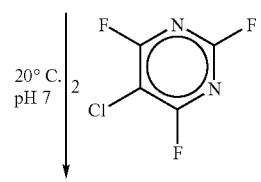

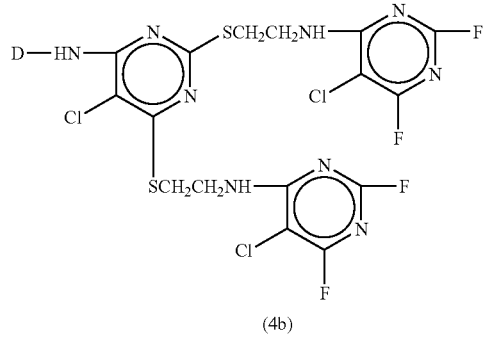

(4b)

Example 5

In this example, the starting reactive dye was an amido quinoxaline dye. The starting material can be prepared by reacting a corresponding quinoxaline carbonyl halide with a dye comprising an amino group.

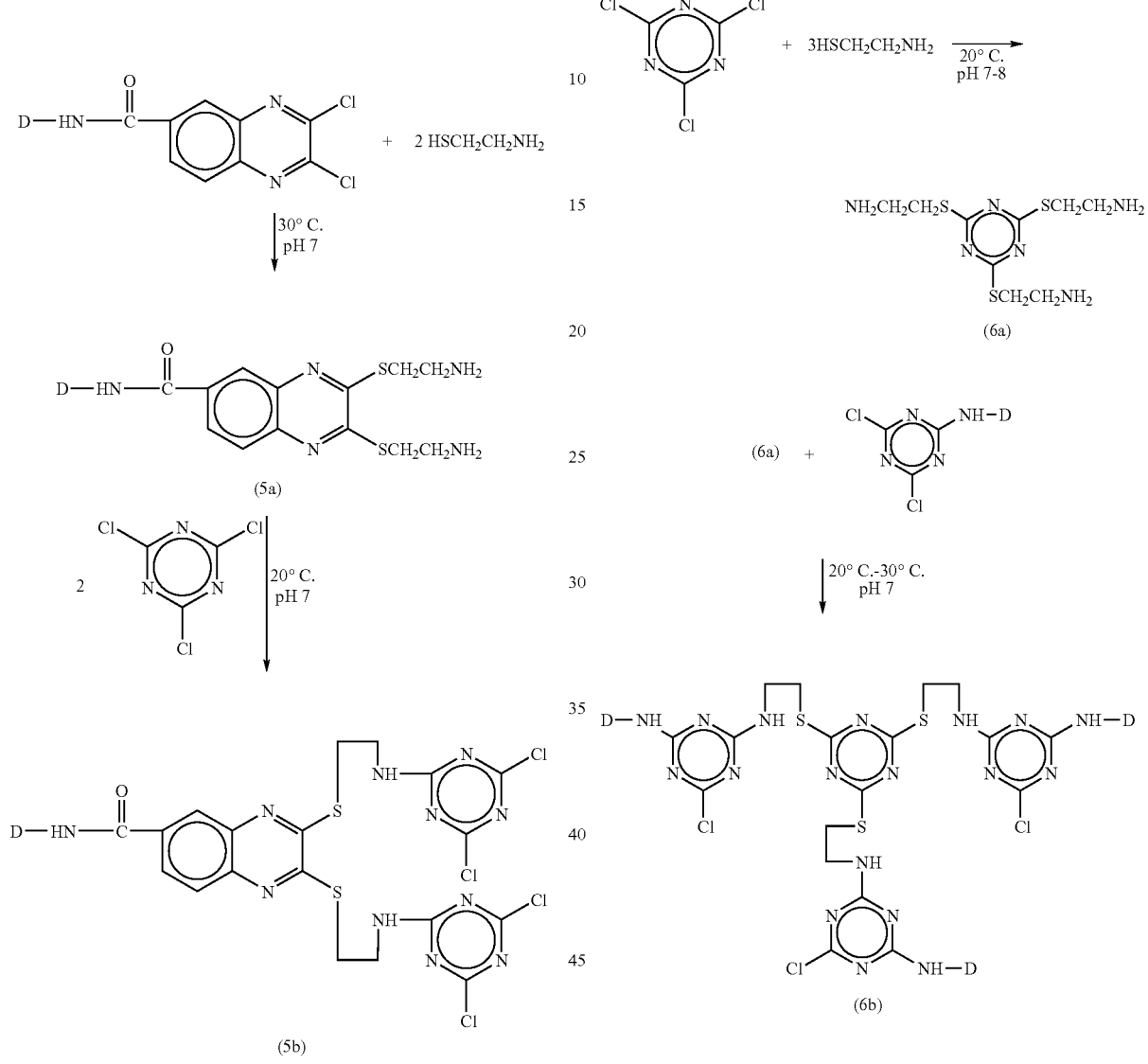

(5a)

(5b)

Example 6

Cyanuric chloride (2,4,6-trichloro-1,3,5-triazine) (0.1 mol) was dissolved in acetone (200 ml). A solution of cysteamine hydrochloride (0.3 mol in 100 ml water) was slowly added to this solution. The pH of the solution was maintained at 7-8 by the addition of solid sodium carbonate. After 7 hours at 20° C. the pH stabilized and compound (6a) precipitated.

Compound (6a) (0.1 mol) was dissolved in water (100 ml) by warming to 30° C. at pH 6. 0.3 mol of Procion Yellow MX-3R dissolved in 300 ml water was slowly added. The pH was maintained at 6-7 by the addition of solid sodium carbonate. After 6 hours, the pH stabilized indicating the formation of dye (6b).

The dye was "salted out" by the addition of sodium sulphate, filtered and washed with an almost saturated sodium sulphate aqueous solution. The dye was dried in a dessicator.

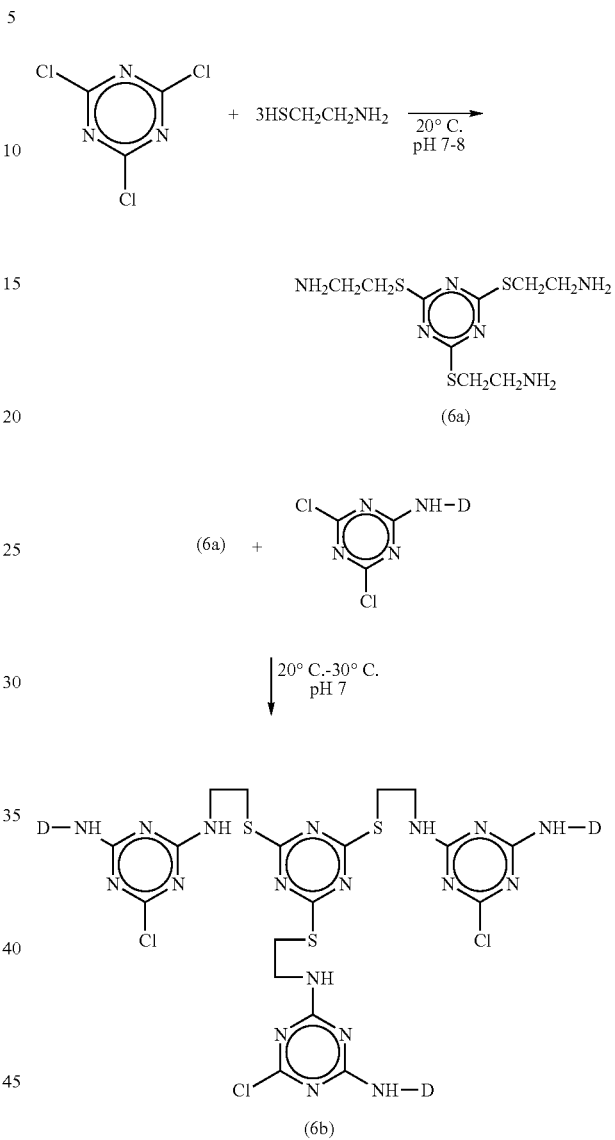

(6a)

(6b)

Example 7

This example illustrates the synthesis of a reactive dye comprising 3 dye chromophores. The starting material was a dichlorotriazine reactive dye such as Procion™ Red MX-8B. In the first stage of the reaction, an aqueous solution comprising 3 moles of cysteamine was slowly added to an aqueous solution of the starting dye (3 moles). In the second stage of the reaction 1 mole of cyanuric chloride dissolved in acetone was added. One third of the cyanuric chloride reacted at 0° C. When the pH stabilized, the temperature was raised at 40° C. where the second third reacted. Finally the temperature was raised to about 80° C. and the last third reacted. The pH was constantly maintained at 7.5 by the addition of $Na_2CO_3$ to neutralize the production of HCl during the reaction.

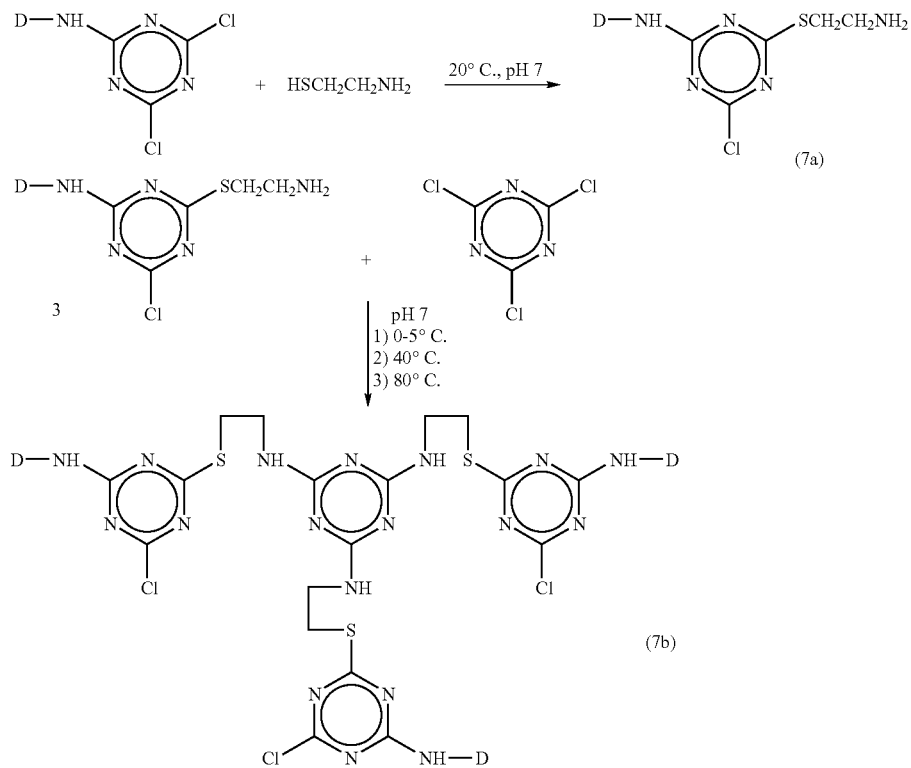

(7a)

(7b)

Example 8

In this example, the starting material was a dichlorotriazine reactive dye (Procion™ Yellow MX-3R). In the first stage of the reaction, an aqueous solution comprising 2 moles of cysteamine was slowly added to an aqueous solution of the starting dye (2 moles). In the second stage of the reaction 1 mole of cyanuric chloride dissolved in acetone was added and the temperature kept at 0° C. until the pH stabilized. The temperature was then raised at 40° C. until the pH stabilized. The pH was constantly maintained at 7.5 by the addition of $Na_2CO_3$ to neutralize the production of HCl during the reaction.

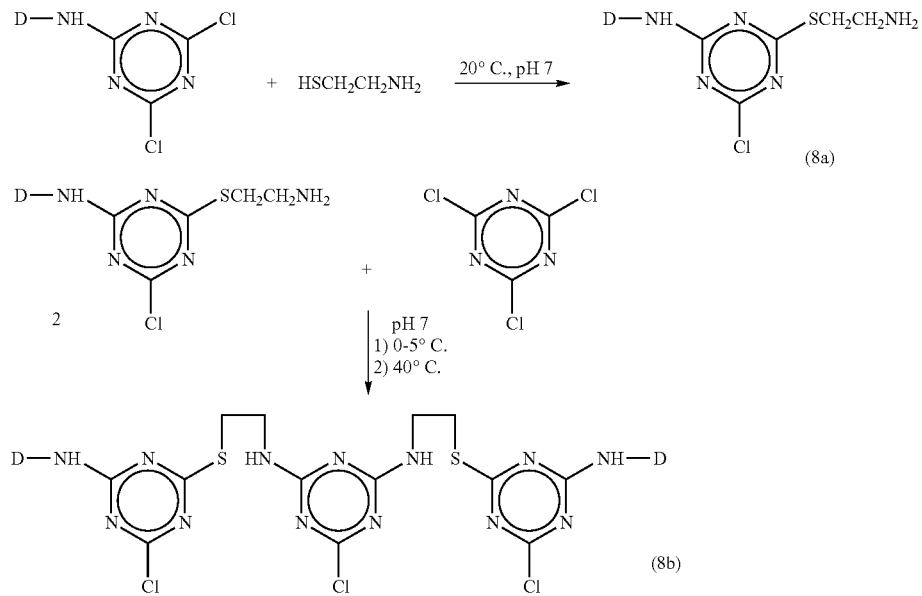

(8a)

(8b)

Example 9

This example illustrates the synthesis of a reactive dye according to formula (IV). The starting material for this example was a commercially available 1,3,5-triazine-2,4,6-trithiol trisodium salt (available from Degussa). 3 moles of starting reactive dye (for example Procion™ Yellow MX-3R) were slowly added to an alkaline solution of 1 mol trimercapto-5-triazine (pH 9, 40° C.). The pH was maintained at 9 by addition of sodium carbonate. The stabilization of the pH indicated the end of the reaction.

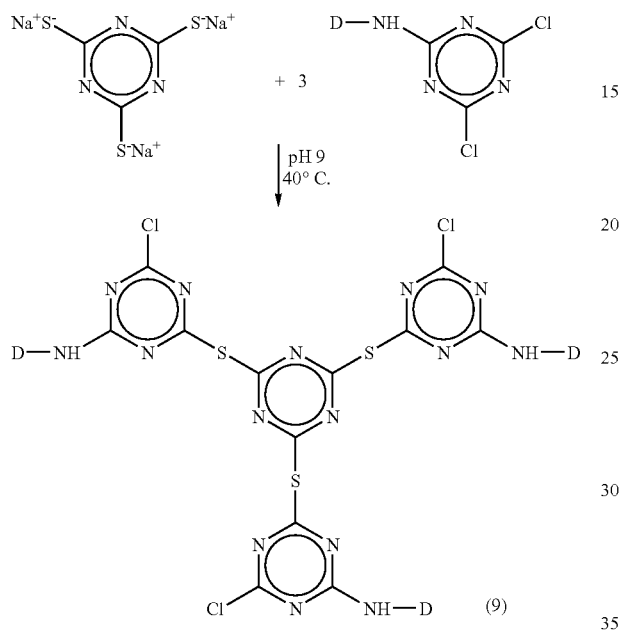

Example 10

This example illustrates the synthesis of a reactive dye according to formula (IV). The starting material was a commercially available N-(2-mercaptoethyl)cysteamine. In the first stage of the reaction, 2 mol of Procion™ Red MX-8B were added to an aqueous solution of the dithiol at 20° C. The pH was maintained at 7.5 during the reaction by addition of $Na_2CO_3$. In the second stage of the reaction, one mole of cyanuric chloride (dissolved in acetone) was slowly added to the above aqueous solution. The pH was maintained at 7.5 (by addition of $Na_2CO_3$) and the temperature at 15° C.

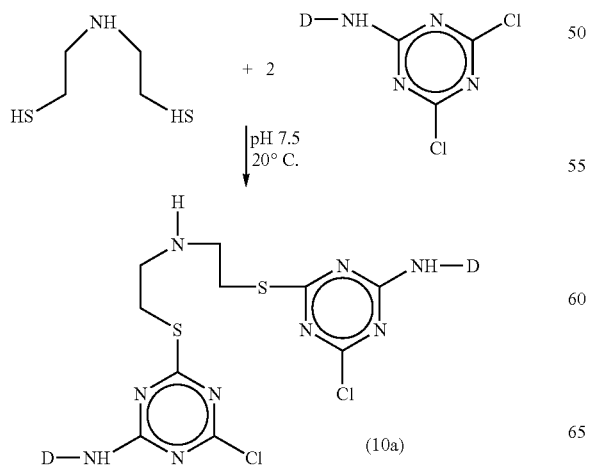

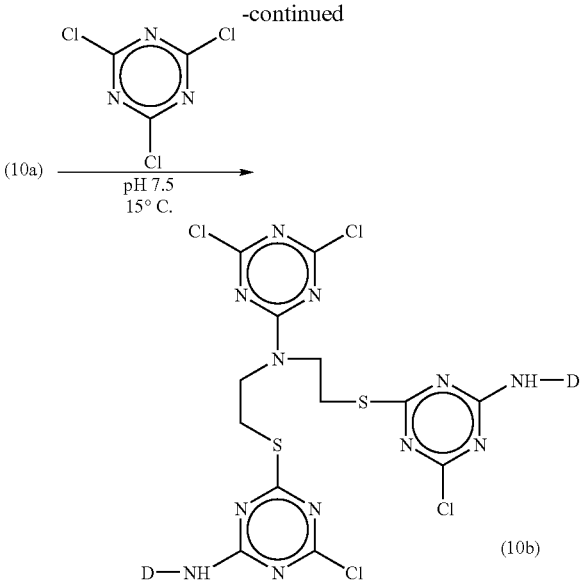

Example 11

This example illustrates the synthesis of a reactive dye according to formula (V) having 3 chromophore moieties. The starting material is tri-2-mercapto-ethylamine (TMEA). TMEA is dissolved in water. 3 moles of Procion™ Yellow MX3R for each mol of TMEA were added (pH 7.5). During all the reaction the pH and temperature were kept at respectively 7.5 (by addition of $Na_2CO_3$) and 20° C. The dye was "salted out" as described previously after the pH stabilized.

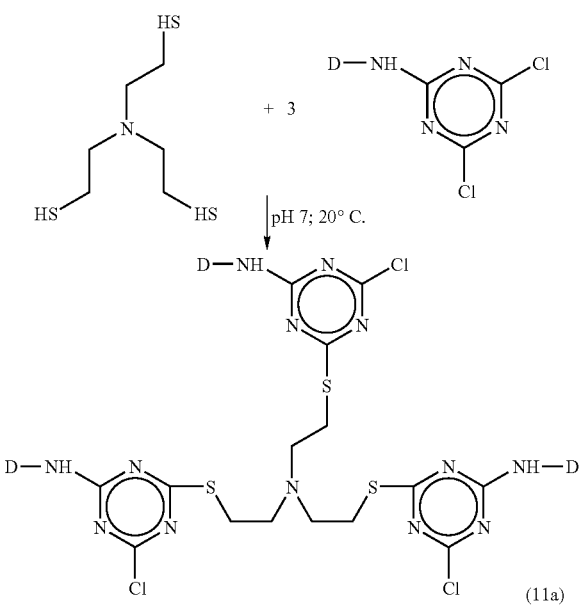

Example 12

This example illustrates the synthesis of a reactive dye according to formula (V). The starting material was 1-aminodiethyl-2,2'-bis-isothiouronium chloride. 3 moles of the 1-amino-diethyl-2,2'-bis-isothiouronium chloride were dissolved in water and the pH adjusted to 7.5. Cyanuric chloride (1 mol) dissolved in acetone was added slowly at 5° C., then when no more HCl was produced, the temperature was increased at 40° C. When the pH stabilized again, the temperature was raised to 90° C. The pH is kept at 7.5 during all reaction by addition of Na$_2$CO$_3$. In the second stage of the reaction, the isothiouronium moiety was hydrolyzed with dilute NaOH (added to the solution until pH 10.5 is reached). In the last stage, 6 moles of dye or mixtures of dyes dissolved in acetone were added at 20° C. (the pH is kept at 7.5° C. by addition of Na$_2$CO$_3$).

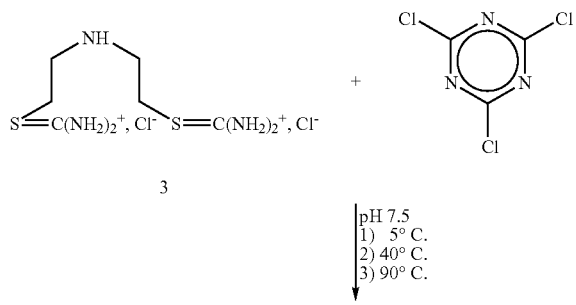

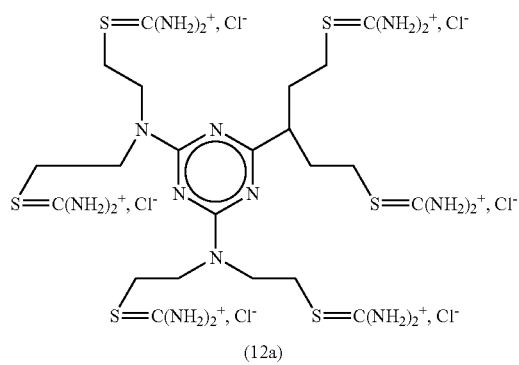

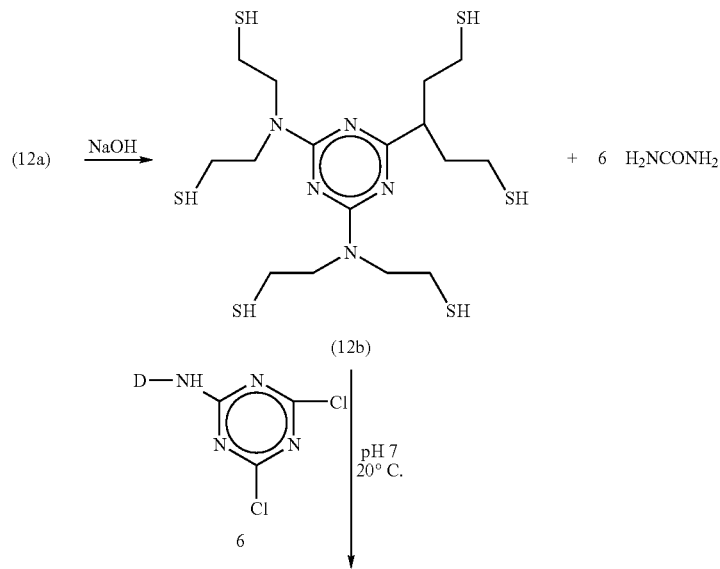

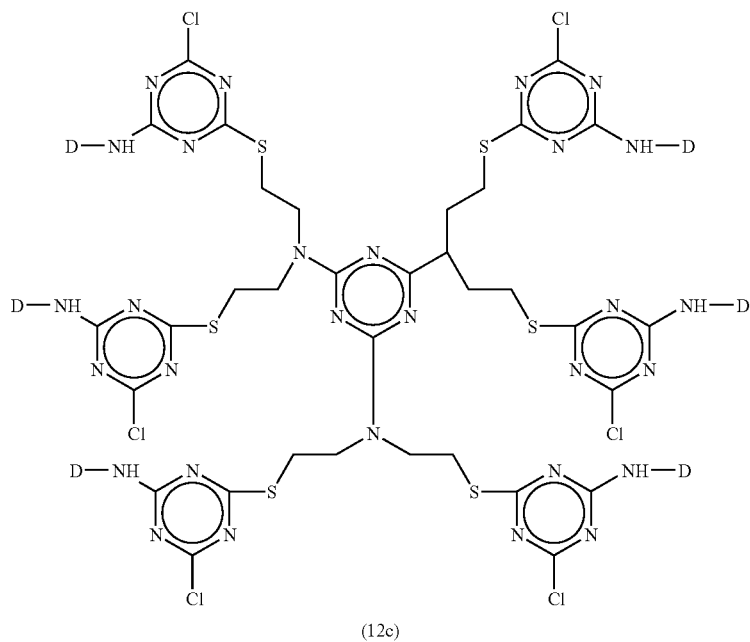

(12c)

Example 13

This example illustrates the synthesis of a reactive dye according to formula (VI) from α-β-dibromo-propionamido or α-bromoacrylamide starting dyes. Examples of such starting dyes can be bought from Ciba under the trademark Lamasol™. In this example, 1 mol of Lamasol™ Blue 3R (Ciba) was reacted with 2 moles of cysteamine at 30° C. and at pH 7.5. When the reaction was complete, 2 moles of cyanuric chloride were added while the pH and temperature were kept at respectively 7.5 by addition of $Na_2CO_3$ at 10° C.

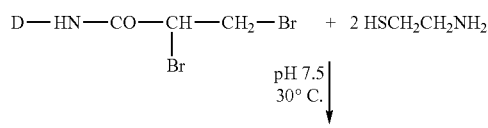

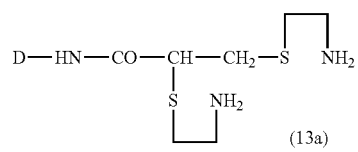

(13a)

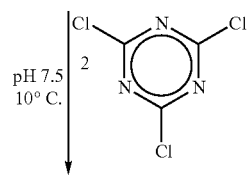

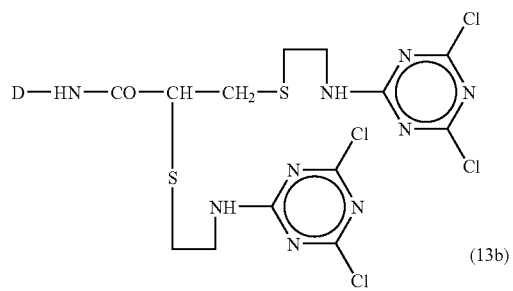

(13b)

Example 14

This example is similar to example 13. 2,4,6-trifluoro-5-chloro-pyrimidine was used instead of cyanuric chloride. The other conditions are identical.

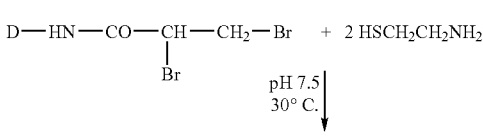

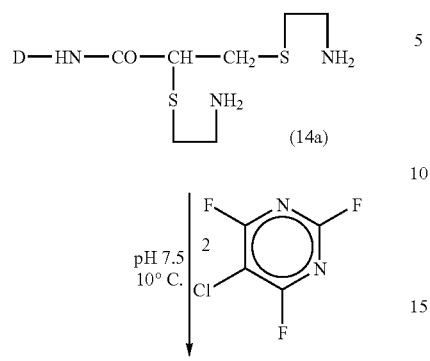

(14a)

(14b)

Examples 15, 16, 17 and 18

The following examples illustrate some reactive dye compounds according to formula (VII). The first step of the synthesis consists of the substitution or addition on a starting reactive dye of 2 leaving groups by two cysteamine derivatives. In the second step of the reaction, two activated N-heterocycles are reacted on the amino side of the cysteamine derivatives.

Ex. 15

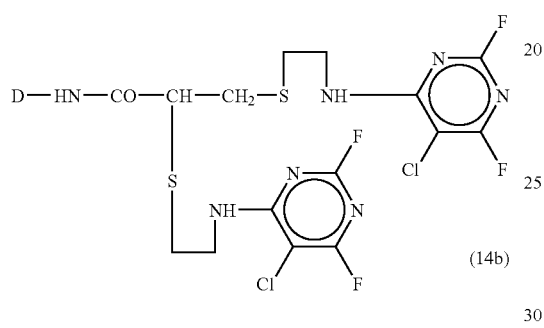

(15a)

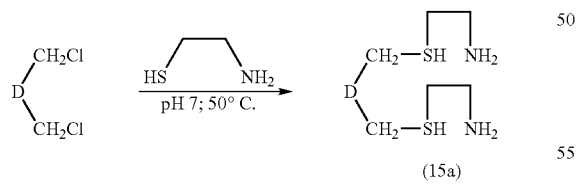

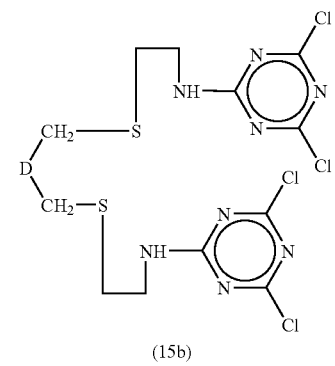

(15b)

Ex. 16

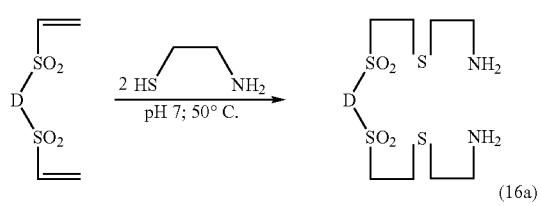

(16a)

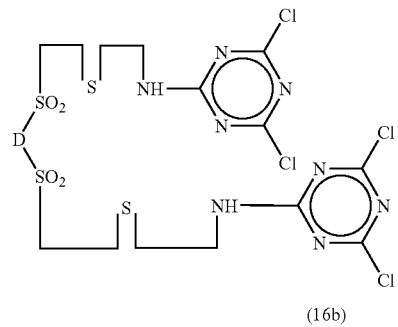

(16b)

Ex. 17

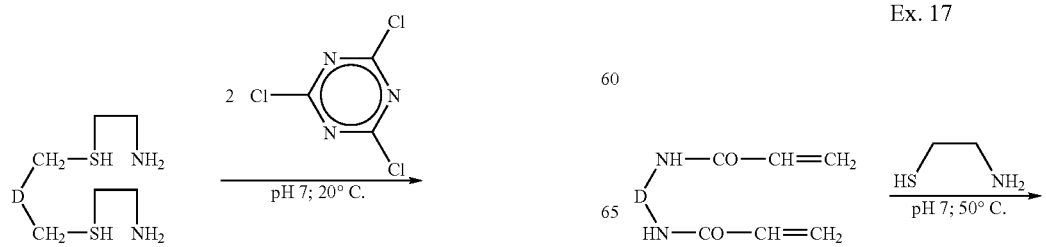

-continued

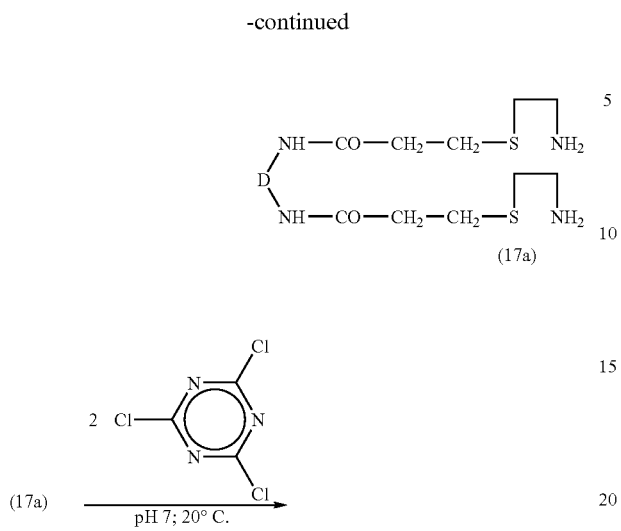

Ex. 18

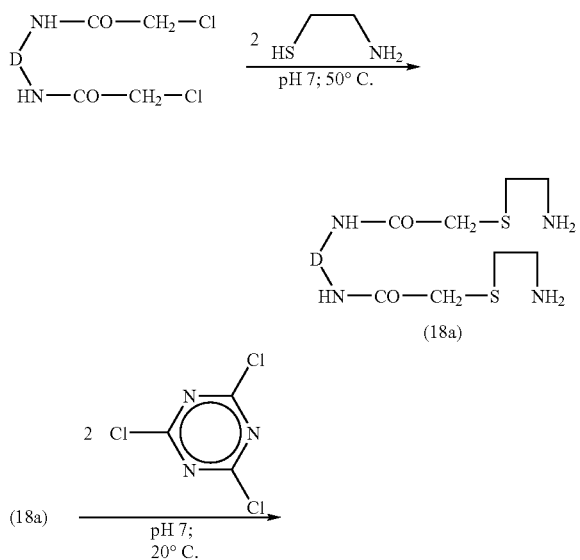

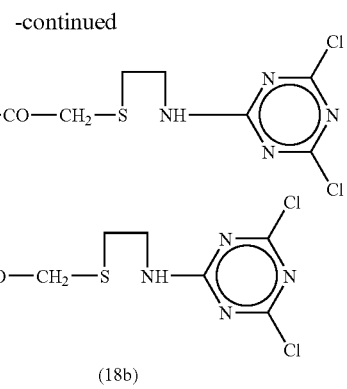

-continued

Method of Use

The dye compounds herein are suitable for dyeing and printing a wide variety of substrates, such as silk, leather, wool, polyamide, polyester fibers and polyurethanes, keratin fibres such as hair, and in particular cellulosic materials, such as the natural cellulose fibres, cotton, linen, hemp and the like, paper, and also cellulose itself and regenerated cellulose, and hydroxyl-containing fibres contained in blend fabrics, for example blends of cotton with polyester or polyamide fibres.

The reactive dye compounds of the present invention can be formulated in various ways, in particular in the form of a solid mixture, aqueous solutions and printing pastes. Thus according to the present invention there is provided a dye composition comprising one or more of the dye compounds described herein together with any carrier material suitable for use in a dye composition.

Preferred dye compositions herein comprise an acidic buffer material. Any acidic buffer suitable for use in dye compositions can be used herein. An example of a suitable buffer is a mixed phosphate buffer giving a potential aqueous solution pH of 5-7, preferably 6.5. When the dye composition herein is in the form of a paste a preferred ingredient is a thickening agent. Any suitable thickening agents suitable for use in dye compositions can be used herein.

In particular the dye compositions can be applied to cellulosic fibers (usually 0.1% to 10% dye on mass of fiber). It is necessary to use alkali in a fixing step to bring about covalent bonding to the cellulosate anion. If applied to polyamides the dye is preferably applied at pH 3-6 at the boil.

When the dye composition is in the form of an aqueous solution or aqueous gel/paste, the dye composition preferably has a pH of about 5 or 6.

When the dye composition is being used for dyeing hair, the composition can comprise one or more of the compounds described herein either alone or in admixture with other well known hair dye compounds such as oxidative dyes, direct dyes, and the like.

The dyeing and printing processes that can be used with the dyes herein are conventional processes which are well known and which have been widely described in the technical and patent literature. The dye compounds herein are suitable for dyeing both by the exhaust method (long liquor) and also by the pad-dyeing method, whereby the goods are impregnated with aqueous, salt-containing or salt-free dye solutions. In the case of cellulosic substrates the dye is fixed after an alkali treatment or in the presence of alkali, if appropriate with the application of heat. The dye compounds herein are also suitable for the cold pad-batch cellulosic fiber-dyeing method, after which the dye together with the alkali is applied to cellulosic fabric using the pad-mangle, batched on a roller and then fixed by storage at room temperature (usually at 4-24 hours). After fixing, the dyeings or prints are thoroughly rinsed with cold and hot water, if appropriate with the addition of an agent acting as a dispersant and promoting the diffusion of the non-fixed portions. Thus in accordance with another aspect of the present invention there is provided a use of the reactive dyes of the present invention for dyeing and printing substrates such as cotton, wool, nylon, silk, keratin, leather, paper and the like. The compounds herein can be used in methods of dyeing all of the substrates listed above by applying an aqueous solution of one or more of the reactive dyes of the present invention to the substrate to be dyed under suitable conditions of pH and temperature.

The following examples serve to illustrate the dyeing of fabric with the reactive dyes according to the present invention.

Example A

The dye produced in example 1 was applied to cotton fabric by the standard long-liquor dyeing process. The dye bath was set with 2% (on weight of fibre or o.w.f.) dye, 40 g/l sodium sulphate and the scoured cotton fabric; the temperature was raised to 50° C. and the fabric agitated in liquor at this temperature for 30 minutes. At this stage sodium carbonate 15 g/l was added and the fabric further agitated for another 30 minutes. The bath was found to be almost water white i.e. the dyebath exhaustion was >95%.

The dyed sample was removed from the bath, rinsed in cold water and soaped off at the boil in an aqueous solution of the nonionic detergent Sandozin™ NIE (2 parts per 1000); soaping for 15 minutes at the boil removed hardly any colour. By measuring the concentration of dye removed by the rinsing and soaping processes the degree of dye fixation could be measured; the Total Covalent Fixative Efficiency (% F) related to the dye originally applied was found to be 93%.

By way of comparison, an equivalent amount of Procion™ Yellow MX-3R was applied to cotton fabric in the presence of 80 g/l sodium sulphate (this dye showed very poor uptake on cotton or exhaustion if 40 g/l salt were to be used).

The dyeings produced, following fixation with sodium carbonate, rinsing and soaping off, was very weak compared to the dyeing produced with the dye of example 1 above; when Total Fixation Efficiency (% F) was calculated it was found to be only 38%. The new classes of dye according to the present invention are very efficient in giving very high levels of fixation even when dyeing cellulosic fibers from baths containing low salt concentrations (40 g/l sodium sulphate).

Example B

The reactive dye (3b) obtained in example 3 was applied to cotton by the method described above. Deep yellow dyeings of Total Fixation Efficiency (% F) greater than 90% were produced.

Example C

The tri-monochloro-s-triazine dye prepared in example 7 was applied to cotton fabric by the following long-liquor dyeing process.

The dyebath was set with cotton fabric, 80 g dm$^{-3}$ sodium sulphate, 2% (owf) dye. The bath was raised to 80° C. and dyeing continued at this temperature for 30 minutes; sodium carbonate (20 g/l) was added and dyeing continued for a further 30 minutes at 80° C. The dyed fabric was removed from the exhausted bath, rinsed and 'soaped-off' as described in Example A. A Total Fixation Efficiency of 91% was obtained.

Example D

The reactive dye compound (8b) prepared in example 8 was applied to cotton fabric by the method described above, but in this case only 2% dye (o.w.f.) and 40 g/l sodium sulphate were used. Total Fixation Efficiency was measured at 92%.

Example E

The reactive dye compound prepared in example 11 was applied by long liquor dyeing to cotton fabric: 3% dye (o.w.f.), 60 g/l Na$_2$SO$_4$. The bath was raised to 80° C. and dyeing continued at this temperature for 30 minutes; sodium carbonate (20 g/l) was added and the dyeing continued a further 30 minutes at 80° C. Cold water rinsing and "soaping" at the boil with non-ionic detergent (Sandozine NIE 2 g/l) completes the process. Excellent color with deep shade was obtained. The Total Fixation Efficiency was 90%.

What is claimed is:

1. A reactive dye compound having the formula (I) below:

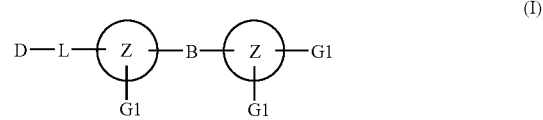

wherein

D is a chromophore;

L is a linking moiety, preferably selected from the group consisting of —NR—, —C(O)NR—, —NRSO$_2$—, —(CH$_2$)$_k$— and —SO$_2$—(CH$_2$)$_k$— wherein R is H or C$_1$-C$_4$ alkyl which can be substituted by halogen, preferably fluorine or chlorine, hydroxyl, cyano, C$_1$-C$_4$ alkoxy, C$_2$-C$_5$ alkoxycarbonyl, carboxyl, sulfamoyl, sulfo or sulfato and wherein k is an integer with a value between 1 and 4;

Z is any moiety forming at least three covalent bonds with other moieties, preferably selected from the group consisting of nitrogen (N),

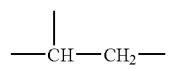

and aromatic compounds, more preferably from the group consisting of aromatic compounds activated by electron withdrawing groups and N-heterocycles, even more preferably from the group consisting of triazine, pyrimidine, quinoxaline, pyrimidinone, phthalazine, pyridazone, pyrazine and

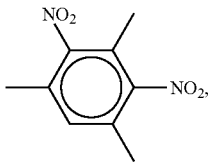

still more preferably from the group consisting of triazine, pyrimidine, and quinoxaline, still even more preferably from triazine;

Y is any leaving group, preferably selected from the group consisting of —Cl, —Br, —F, —I, —SO$_3$H, —OSO$_3$H, —SSO$_3$H, —O—C$_6$H$_4$—SO$_3$H, —OCO—CH$_3$, —OPO$_3$H$_2$, —OCO—C$_6$H$_5$, —OSO$_2$—C$_1$-C$_4$ alkyl, —OSO$_2$—N(C$_1$-C$_4$ alkyl)$_2$,

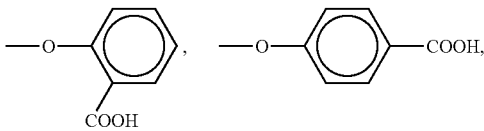

and quaternized nitrogen derivatives, more preferably selected from the group consisting of —Cl, —Br, —F and —OSO$_3$H, even more preferably from the group consisting of —F and —Cl when Y is bonded to an N-containing heterocycle and —Br when Y is bonded to

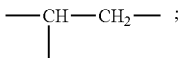

G1 is selected from the group consisting of Y and —B—G2;

G2 is selected from the group consisting of

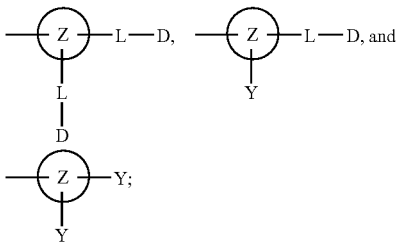

B is a bridging moiety selected from the group consisting of —S—,

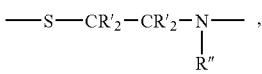

and —S—CR'$_2$—CR'$_2$— wherein R' is selected from the group consisting of H, C1-C10 alkyl group, C1-C10 carboxylic acid and sulphonate, preferably H; and wherein R" is selected from the group consisting of H, C1-C4 alkyl group and —CR'$_2$—CR'$_2$—S—G2;

B preferably being —NH—CH$_2$—CH$_2$—S— or —NH—CHCOOH—CH$_2$—S—, wherein when there is more than one D, R, R', R", L, Z, Y, G1, G2 or B these are not necessarily the same; and wherein the reactive dye compound comprises at least one group G2; and salts and esters thereof.

2. A reactive dye compound having the formula (II):

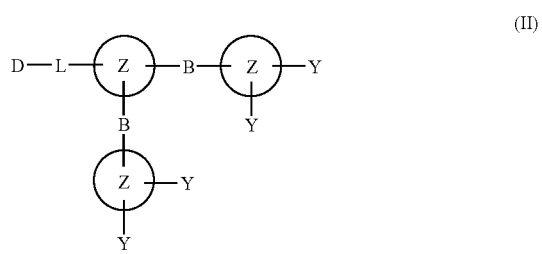

wherein

D is a chromophore;

L is a linking moiety, preferably selected from the group consisting of —NR—, —C(O)NR—, —NRSO$_2$—, —(CH$_2$)$_k$— and —SO$_2$—(CH$_2$)$_k$— wherein R is H or C$_1$-C$_4$ alkyl which can be substituted by halogen, preferably fluorine or chlorine, hydroxyl, cyano, C$_1$-C$_4$ alkoxy, C$_2$-C$_5$ alkoxycarbonyl, carboxyl, sulfamoyl, sulfo or sulfato and wherein k is an integer with a value between 1 and 4;

Z is any moiety forming at least three covalent bonds with other moieties, preferably selected from the group consisting of nitrogen (N),

and aromatic compounds, more preferably from the group consisting of aromatic compounds activated by electron withdrawing groups and N-heterocycles, even more preferably from the group consisting of triazine, pyrimidine, quinoxaline, pyrimidinone, phthalazine, pyridazone, pyrazine and

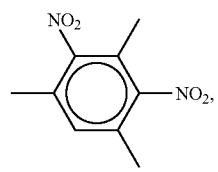

still more preferably from the group consisting of triazine, pyrimidine, and quinoxaline, still even more preferably from triazine;

Y is any leaving group, preferably selected from the group consisting of —Cl, —Br, —F, —I, —SO$_3$H, —OSO$_3$H, —SSO$_3$H, —O—C$_6$H$_4$—SO$_3$H, —OCO—CH$_3$, —OPO$_3$H$_2$, —OCO—C$_6$H$_5$, —OSO$_2$—C$_1$-C$_4$ alkyl, —OSO$_2$—N(C$_1$-C$_4$ alkyl)$_2$,

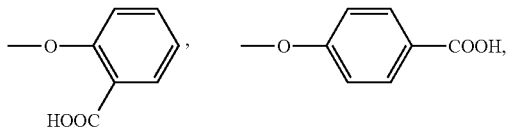

and quaternized nitrogen derivatives, more preferably selected from the group consisting of —Cl, —Br, —F and —OSO$_3$H, even more preferably from the group consisting of —F and —Cl when Y is bonded to an N-containing heterocycle and —Br when Y is bonded to

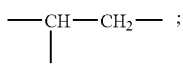

B is

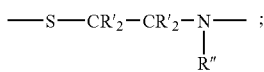

wherein R' is selected from the group consisting of H, C1-C10 alkyl group, C1-C10 carboxylic acid and sulphonate, preferably H; and R" is selected from the group consisting of H, C1-C4 alkyl group, B preferably being —NH—CH$_2$—CH$_2$—S— or —NH—CHCOOH—CH$_2$—S—, wherein when there is more than one D, L, Z, Y, R, R', R" or B group these are not necessarily the same;

and salts and esters thereof.

3. A reactive dye compound according to claim 1 having the formula (III):

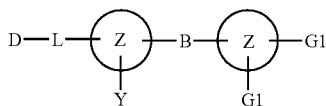

wherein

B is

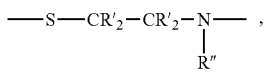

wherein R' is selected from the group consisting of H, C1-C10 alkyl group, C1-C10 carboxylic acid and sulphonate, preferably H; and R" is selected from the group consisting of H, C1-C4 alkyl group, B preferably being —NH—CH$_2$—CH$_2$—S— or —NH—CHCOOH—CH$_2$—S—;

and salts and esters thereof.

4. A reactive dye compound having the formula (IV):

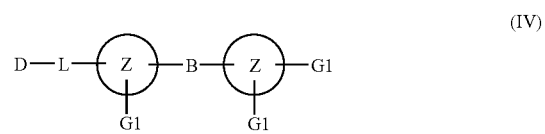

wherein

D is a chromophore;

L is a linking moiety, preferably selected from the group consisting of —NR—, —C(O)NR—, —NRSO$_2$—, —(CH$_2$)$_k$— and —SO$_2$—(CH$_2$)$_k$— wherein R is H or C$_1$-C$_4$ alkyl which can be substituted by halogen, preferably fluorine or chlorine, hydroxyl, cyano, C$_1$-C$_4$ alkoxy, C$_2$-C$_5$ alkoxycarbonyl, carboxyl, sulfamoyl, sulfo or sulfato and wherein k is an integer with a value between 1 and 4;

Z is any moiety forming at least three covalent bonds with other moieties, preferably selected from the group consisting of nitrogen (N),

and aromatic compounds, more preferably from the group consisting of aromatic compounds activated by electron withdrawing groups and N-heterocycles, even more preferably from the group consisting of triazine, pyrimidine, quinoxaline, pyrimidinone, phthalazine, pyridazone, pyrazine and

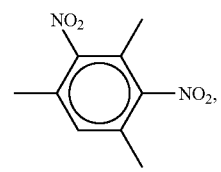

still more preferably from the group consisting of triazine, pyrimidine, and quinoxaline, still even more preferably from triazine;

Y is any leaving group, preferably selected from the group consisting of —Cl, —Br, —F, —I, —SO$_3$H, —OSO$_3$H, —SSO$_3$H, —O—C$_6$H$_4$—SO$_3$H, —OCO—CH$_3$, —OPO$_3$H$_2$, —OCO—C$_6$H$_5$, —OSO$_2$—C$_1$-C$_4$ alkyl, —OSO$_2$—N(C$_1$-C$_4$ alkyl)$_2$,

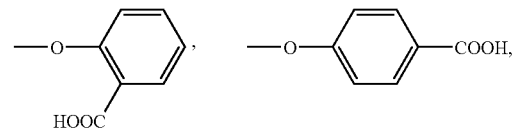

and quaternized nitrogen derivatives, more preferably selected from the group consisting of —Cl, —Br, —F and —OSO$_3$H, even more preferably from the group consisting of —F and —Cl when Y is bonded to an N-containing heterocycle and —Br when Y is bonded to

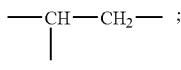

G1 is selected from the group consisting of Y and —B-G2;
G2 is selected from the group consisting of

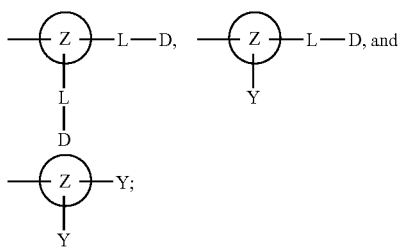

B is a bridging moiety selected from the group consisting of —S—,

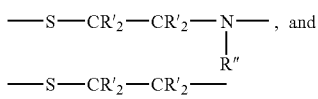

wherein R' is selected from the group consisting of H, $C_1$-$C_{10}$ alkyl group, $C_1$-$C_{10}$ carboxylic acid and sulphonate, preferably H; and wherein R" is selected from the group consisting of H, $C_1$-$C_4$ alkyl group and —CR'$_2$—CR'$_2$—S-G2, wherein at least one, and preferably all, B is —S—;

wherein when there is more than one B, D, R, L, Z, Y, G1 or G2 within the same molecule these are not necessarily the same; and wherein the reactive dye compound comprises at least one group G2; and salts and esters thereof.

5. A reactive dye compound having the formula (V):

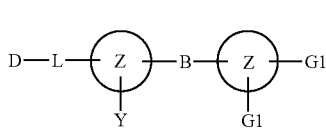

wherein

D is a chromophore;

L is a linking moiety, preferably selected from the group consisting of —NR—, —C(O)NR—, —NRSO$_2$—, —(CH$_2$)$_k$— and —SO$_2$—(CH$_2$)$_k$— wherein R is H or $C_1$-$C_4$ alkyl which can be substituted by halogen, preferably fluorine or chlorine, hydroxyl, cyano, $C_1$-$C_4$ alkoxy, $C_2$-$C_5$ alkoxycarbonyl, carboxyl, sulfamoyl, sulfo or sulfato and wherein k is an integer with a value between 1 and 4;

Z is any moiety forming at least three covalent bonds with other moieties, preferably selected from the group consisting of nitrogen

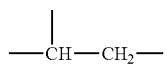

and aromatic compounds, more preferably from the group consisting of aromatic compounds activated by electron withdrawing groups and N-heterocycles, even more preferably from the group consisting of triazine, pyrimidine, quinoxaline, pyrimidinone, phthalazine, pyridazone, pyrazine and

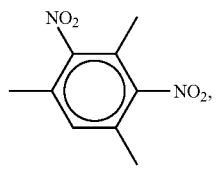

still more preferably from the group consisting of triazine, pyrimidine, and quinoxaline, still even more preferably from triazine;

Y is any leaving group, preferably selected from the group consisting of —Cl, —Br, —F, —I, —SO$_3$H, OSO$_3$H, —SSO$_3$H, —O—C$_6$H$_4$—SO$_3$H, —OCO—CH$_3$, —OPO$_3$H$_2$, —OCO—C$_6$H$_5$, —OSO$_2$—C$_1$-C$_4$ alkyl, —OSO$_2$—N(C$_1$-C$_4$ alkyl)$_2$,

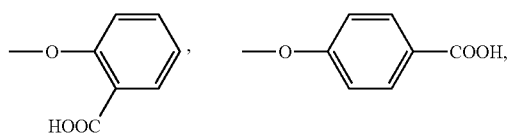

and quaternized nitrogen derivatives, more preferably selected from the group consisting of —Cl, —Br, —F and —OSO$_3$H, even more preferably from the group consisting of —F and —Cl when Y is bonded to an N-containing heterocycle and —Br when Y is bonded to

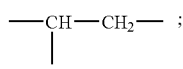

G1 is selected from the group consisting of Y and —B-G2;
G2 is selected from the group consisting of

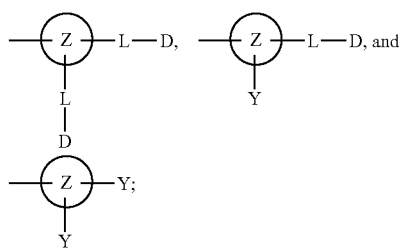

B is a bridging group selected from the group consisting of

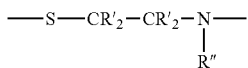

and —S—CR'$_2$—CR'$_2$;
wherein R" is selected from the group consisting of H, C$_1$-C$_4$ alkyl group and —CR'$_2$—CR'$_2$—S-G$_2$; and
wherein R' is selected from the group consisting of H, C1-C10 alkyl group, C1-C10 carboxylic acid and sulphonate, preferably H,
wherein when there is more than one D, R, R', R", L, Z, Y, G1, G2, or B group they are not necessarily the same; and
wherein the reactive dye compound comprises at least one bridging group B wherein R" is —CR'$_2$—CR'$_2$—S-G2; and salts and esters thereof.

6. A reactive dye compound having the formula (VI)

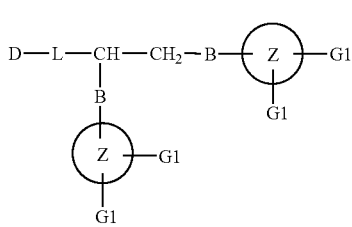

(VI)

wherein
D is a chromophore;
L is a linking moiety, preferably selected from the group consisting of —NR—, —C(O)NR—, —NRSO$_2$—, —(CH$_2$)$_k$— and —SO$_2$—(CH$_2$)$_k$— wherein R is H or C$_1$-C$_4$ alkyl which can be substituted by halogen, preferably fluorine or chlorine, hydroxyl, cyano, C$_1$-C$_4$ alkoxy, C$_2$-C$_5$ alkoxycarbonyl, carboxyl, sulfamoyl, sulfo or sulfato and wherein k is an integer with a value between 1 and 4;
Z is any moiety forming at least three covalent bonds with other moieties, preferably selected from the group consisting of nitrogen (N),

and aromatic compounds, more preferably from the group consisting of aromatic compounds activated by electron withdrawing groups and N-heterocycles, even more preferably from the group consisting of triazine, pyrimidine, quinoxaline, pyrimidinone, phthalazine, pyridazone, pyrazine and

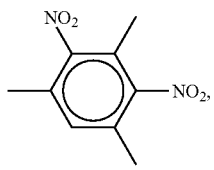

still more preferably from the group consisting of triazine, pyrimidine, and quinoxaline, still even more preferably from triazine;
Y is any leaving group, preferably selected from the group consisting of —Cl, —Br, —F, —I, —SO$_3$H, —OSO$_3$H, —SSO$_3$H, —O—C$_6$H$_4$—SO$_3$H, —OCO—CH$_3$, —OPO$_3$H$_2$, —OCO—C$_6$H$_5$, —OSO$_2$—C$_1$-C$_4$ alkyl, —OSO$_2$—N(C$_1$-C$_4$ alkyl)$_2$,

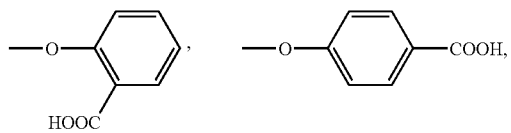

and quaternized nitrogen derivatives, more preferably selected from the group consisting of —Cl, —Br, —F and —OSO$_3$H, even more preferably from the group consisting of —F and —Cl when Y is bonded to an N-containing heterocycle and —Br when Y is bonded to

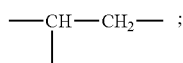

G1 is selected from the group consisting of Y and —B-G2;
G2 is selected from the group consisting of

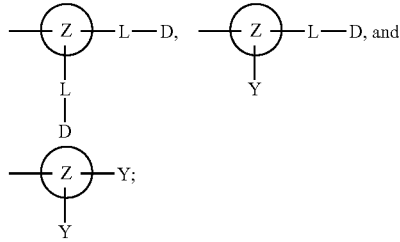

B is a bridging moiety, preferably selected from the group consisting of —S—,

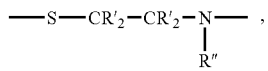

and —S—CR'$_2$—CR'$_2$
wherein R" is selected from the group consisting of H, C1-C4 alkyl group and —CR'$_2$ CR'$_2$S-G2
wherein R' is selected from the group consisting of H, C$_1$-C$_{10}$ alkyl group C$_1$-C$_{10}$ carboxylic acid and sulphonate, preferably H,
B preferably being —NH—CH$_2$—CH$_2$—S— or —NH—CHCOOH—CH$_2$—S—,
wherein when there is more than one D, R, R', R", L, Z, Y, G1, G2 or B group they are not necessarily the same;
wherein the reactive dye compound comprises at least one group G2; and salts and esters thereof.

7. A method for synthesizing a reactive dye compound according to claim 1 using a starting reactive dye compound and a dissymmetric bridging moiety B, wherein said method comprises the steps of:

a) reacting said starting reactive dye compound with a first group of said dissymmetric bridging moiety B and forming one bond, and
b) reacting a second group of said dissymmetric bridging moiety B with a moiety Z.

8. A method according to claim 7, wherein said bridging moiety B has the following formula:

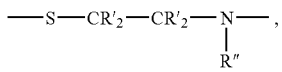

wherein R' is selected from the group consisting of H, $C_1$-$C_{10}$ alkyl group, $C_1$-$C_{10}$ carboxylic acid and sulphonate, preferably H; and R" is selected from the group consisting of H and C1-C4 alkyl group.

9. A method for synthesizing a reactive dye compound of Formula (I):

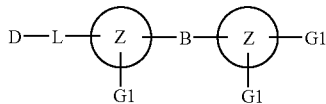

wherein:
D is a chromophore;
L is a linking moiety, preferably selected from the group consisting of —NR—, —C(O)NR—, —NRSO$_2$—, —(CH$_2$)$_k$— and —SO$_2$—(CH$_2$)$_k$— wherein R is H or $C_1$-$C_4$ alkyl which can be substituted by halogen, preferably fluorine or chlorine, hydroxyl, cyano, $C_1$-$C_4$ alkoxy, $C_2$-$C_5$ alkoxycarbonyl, carboxyl, sulfamoyl, sulfo or sulfato and wherein k is an integer with a value between 1 and 4;
Z is any moiety forming at least three covalent bonds with other moieties, preferably selected from the group consisting of nitrogen (N),

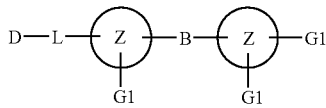

and aromatic compounds, more preferably from the group consisting of aromatic compounds activated by electron withdrawing groups and N-heterocycles, even more preferably from the group consisting of triazine, pyrimidine, quinoxaline, pyrimidinone, phthalazine, pyridazone, pyrazine and

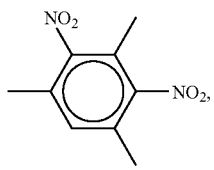

still more preferably from the group consisting of triazine, pyrimidine, and quinoxaline, still even more preferably from triazine;

Y is any leaving group, preferably selected from the group consisting of —Cl, —Br, —F, —I, —SO$_3$H, —OSO$_3$H, —SSO$_3$H, —O—C$_6$H$_4$—SO$_3$H, —OCO—CH$_3$, OPO$_3$H$_2$, —OCO—C$_6$H$_5$, —OSO$_2$—C$_1$-C$_4$ alkyl, —OSO$_2$—N(C$_1$-C$_4$ alkyl)$_2$,

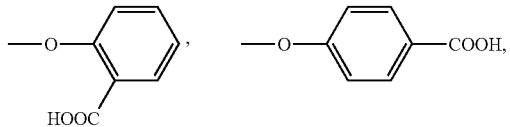

and quaternized nitrogen derivatives, more preferably selected from the group consisting of —Cl, —Br, —F and —OSO$_3$H, even more preferably from the group consisting of —F and —Cl when Y is bonded to an N-containing heterocycle and —Br when Y is bonded to

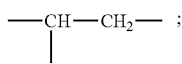

G1 is selected from the group consisting of Y and —B-G2;
G2 is selected from the group consisting of

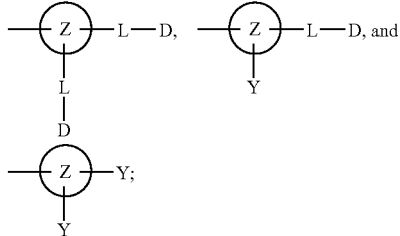

B is a dissymmetric bridging moiety having the formula —S—CR'$_2$—CR'$_2$—N(R")—, wherein R' is selected from the group consisting of H, $C_1$-$C_{10}$ alkyl group, $C_1$-$C_{10}$ carboxylic acid, and sulphonate; and R" is selected from the group consisting of H and $C_1$-$C_4$ alkyl group;
wherein when there is more than one D, R, R', R", L, Z, Y, G1, G2, or B these are not necessarily the same;
wherein the reactive dye compound comprises at least one group G2; and
wherein at least one R' is COOH; and
salts and esters thereof;
wherein said method comprises the steps of:
a) reacting a starting reactive dye compound with a first group of bridging moiety B and forming one bond, and
b) reacting a second group of said bridging moiety B with a moiety Z.

10. A method according to claim 7 or claim 8 wherein step a) and/or step b) is repeated at least two times.

11. A method for dyeing a substrate wherein said method comprises the step of applying a composition comprising a reactive dye compound according to claim 1.

12. A method for dyeing a substrate wherein said method comprises the step of applying a composition comprising a reactive dye compound according to claim 2.

13. A method for dyeing a substrate wherein said method comprises the step of applying a composition comprising a reactive dye compound according to claim 3.

14. A method for dyeing a substrate wherein said method comprises the step of applying a composition comprising a reactive dye compound according to claim 4.

15. A method for dyeing a substrate wherein said method comprises the step of applying a composition comprising a reactive dye compound according to claim 5.

16. A method for dyeing a substrate wherein said method comprises the step of applying a composition comprising a reactive dye compound according to claim 6.

17. A method according to claim 9 wherein step a) and/or step b) is repeated at least two times.

* * * * *